US010712973B2

United States Patent
Takagawa et al.

(10) Patent No.: US 10,712,973 B2
(45) Date of Patent: Jul. 14, 2020

(54) STORAGE MANAGEMENT APPARATUS, STORAGE SYSTEM, AND NON-TRANSITORY COMPUTER-READABLE RECORDING MEDIUM HAVING STORED THEREIN STORAGE MANAGEMENT PROGRAM

(71) Applicant: FUJITSU LIMITED, Kawasaki-shi, Kanagawa (JP)

(72) Inventors: Tomoshi Takagawa, Nagoya (JP); Fumihiko Kono, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/283,389

(22) Filed: Feb. 22, 2019

(65) Prior Publication Data
US 2019/0286371 A1    Sep. 19, 2019

(30) Foreign Application Priority Data
Mar. 16, 2018    (JP) .................................. 2018-048981

(51) Int. Cl.
*G06F 3/06* (2006.01)

(52) U.S. Cl.
CPC .......... *G06F 3/0659* (2013.01); *G06F 3/0604* (2013.01); *G06F 3/067* (2013.01); *G06F 3/0661* (2013.01)

(58) Field of Classification Search
CPC ...... G06F 3/0659; G06F 3/0604; G06F 3/067; G06F 11/3068; G06F 11/3034
See application file for complete search history.

(56) References Cited

U.S. PATENT DOCUMENTS

| 2009/0287887 A1* | 11/2009 | Matsuki ................ G06F 3/0607 711/154 |
| 2012/0089797 A1* | 4/2012 | Shibayama ......... G06F 11/3419 711/162 |
| 2014/0081906 A1* | 3/2014 | Geddam ................ G06F 16/21 707/609 |

(Continued)

FOREIGN PATENT DOCUMENTS

| JP | 5-313984 | 11/1993 |
| JP | 10-27127 | 1/1998 |

(Continued)

*Primary Examiner* — Edward J Dudek, Jr.
(74) *Attorney, Agent, or Firm* — Staas & Halsey LLP

(57) ABSTRACT

A storage management apparatus includes a processor and a memory. The processor is configured to: identify a type of a storage apparatus based on a result of reception of a state information on the storage apparatus; execute first processing to receive, when the identified type is a first storage apparatus, first performance information on the first storage apparatus from the first storage apparatus, and store the first performance information in a database as data of a table coordinating the first performance information for each time period of reception; execute second processing to receive, when the identified type is a second storage apparatus, second performance information on the second storage apparatus from the second storage apparatus, and store the second performance information in the memory as data of a text-format file; and switch an execution between the first processing and the second processing depending on the identified type.

18 Claims, 17 Drawing Sheets

(56) References Cited

U.S. PATENT DOCUMENTS

| | | | |
|---|---|---|---|
| 2014/0317286 A1 | 10/2014 | Masuda et al. | |
| 2015/0193323 A1* | 7/2015 | Banerjee | G06F 11/3409 |
| | | | 702/182 |
| 2016/0337167 A1 | 11/2016 | Kawato | |
| 2018/0004452 A1* | 1/2018 | Ganguli | H04L 43/0817 |

FOREIGN PATENT DOCUMENTS

| | | |
|---|---|---|
| JP | 11-7401 | 1/1999 |
| JP | 2004-30491 | 1/2004 |
| JP | 2015-60275 | 3/2015 |
| JP | 2015-92420 | 5/2015 |
| JP | 2017-103580 | 6/2017 |
| WO | 2015/107574 A1 | 7/2015 |

* cited by examiner

FIG. 3

PERFORMANCE INFORMATION 212

⟨Storages⟩ 212a

| time_Stamp | IOPS | Throughput | Response | Hit_Rate | ... | Cache_Use_Rate | Cache_Available_Size | CPU_Use_Rate | CPU_Idle_Time | Temperature |
|---|---|---|---|---|---|---|---|---|---|---|
| yyyy/mm/dd hh:mm | NUMBER | NUMBER | NUMBER | NUMBER | ... | NUMBER | NUMBER | NUMBER | NUMBER | NUMBER |
| yyyy/mm/dd hh:mm | NUMBER | NUMBER | NUMBER | NUMBER | ... | NUMBER | NUMBER | NUMBER | NUMBER | NUMBER |
| ... | ... | ... | ... | ... | ... | ... | ... | ... | ... | ... |

Read / Write / Read & Write

⟨Nodes⟩ 212b

| time_Stamp | IOPS | Throughput | Response | Hit_Rate | ... | Hit_Count | Cache_Miss_Count | Cache_Use_Rate | Cache_Available_Size | CPU_Use_Rate | CPU_Idle_Time | ... |
|---|---|---|---|---|---|---|---|---|---|---|---|---|
| yyyy/mm/dd hh:mm | NUMBER | NUMBER | NUMBER | NUMBER | ... | NUMBER | NUMBER | NUMBER | NUMBER | NUMBER | NUMBER | ... |
| yyyy/mm/dd hh:mm | NUMBER | NUMBER | NUMBER | NUMBER | ... | NUMBER | NUMBER | NUMBER | NUMBER | NUMBER | NUMBER | ... |
| ... | ... | ... | ... | ... | ... | ... | ... | ... | ... | ... | ... | ... |

Read / Write / Read & Write

ADMINISTRATION TABLE ~213

| PARTITION TABLE NAME | STORAGE IDENTIFIER | Resource_Type | Start_Time | End_Time | Last_Update |
|---|---|---|---|---|---|
| performance_xxxxxx_storages_part_20171001 | xxxxxx | Storages | 2017/10/1 0:00 | 2017/10/1 18:00 | 2017/10/1 18:00 |
| performance_xxxxxx_nodes_part_20171001 | xxxxxx | Nodes | 2017/10/1 0:00 | 2017/10/1 18:00 | 2017/10/1 18:00 |
| ... | ... | ... | ... | ... | ... |
| performance_xxxxxx_storages_part_20171002 | xxxxxx | Storages | 2017/10/2 0:00 | 2017/10/2 18:00 | 2017/10/2 18:00 |
| performance_xxxxxx_nodes_part_20171002 | xxxxxx | Nodes | 2017/10/2 0:00 | 2017/10/2 18:00 | 2017/10/2 18:00 |
| ... | ... | ... | ... | ... | ... |
| performance_xxxxxx_storages_part_20171008 | xxxxxx | Storages | 2017/10/8 0:00 | 2017/10/8 18:00 | 2017/10/8 18:00 |
| performance_xxxxxx_nodes_part_20171008 | xxxxxx | Nodes | 2017/10/8 0:00 | 2017/10/8 18:00 | 2017/10/8 18:00 |
| ... | ... | ... | ... | ... | ... |

FIG. 13

|  |  | MONITOR THREAD | | | |
|---|---|---|---|---|---|
|  |  | Normal | Recovering | Internal Error | Timeout →Error |
| DB MANAGEMENT THREAD | Normal | Monitoring | Recovering | Error | Timeout →Error |
|  | Busy | Monitoring | Recovering | Error | Error |
|  | Internal Error | Error | Error | Error | Error |
|  | Stop | Timeout →Error | Recovering | Error | Stop |

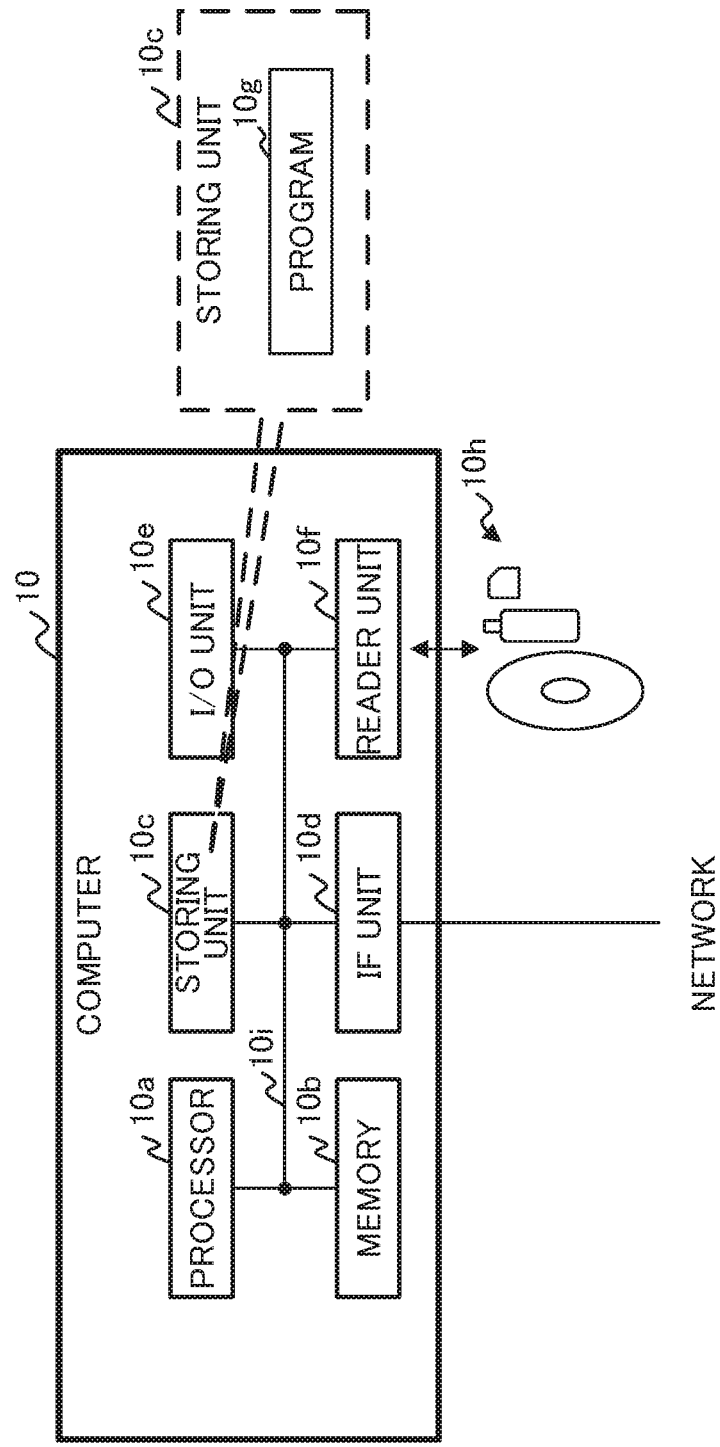

STORAGE MANAGEMENT APPARATUS, STORAGE SYSTEM, AND NON-TRANSITORY COMPUTER-READABLE RECORDING MEDIUM HAVING STORED THEREIN STORAGE MANAGEMENT PROGRAM

CROSS-REFERENCE TO RELATED APPLICATION

This application is based upon and claims the benefit of priority of the prior Japanese Patent Application No. 2018-048981, filed on Mar. 16, 2018, the entire contents of which are incorporated herein by reference.

FIELD

The present embodiment relates to a storage management apparatus, a storage system, and a non-transitory computer-readable recording medium having stored therein a storage management program.

BACKGROUND

In storage systems, a storage management apparatus may be used, which provides functions including managements of the storage apparatuses, such as configuration managements, failure managements, and performance information managements of the storage apparatuses. Such a storage management apparatus manages the storage environment in a comprehensive manner, thereby achieving reliable operations of a storage system.

In a storage management apparatus, for example, performance information on conventional storage apparatuses and the like are graphically displayed, thereby providing users with information usable for optimizing input/output (I/O) performances defined in business requirements and allowing thresholds to be set to apparatuses and volumes for monitoring. This allows the users to be aware of any performance problems and to take countermeasures before the problems will affect on operations.

Patent Document 1: Japanese Laid-open Patent Publication No. 2017-103580
Patent Document 2: Japanese Laid-open Patent Publication No. 2004-30491
Patent Document 3: International Publication Pamphlet No. WO 2015/107574
Patent Document 4: Japanese Laid-open Patent Publication No. 05-313984
Patent Document 5: Japanese Laid-open Patent Publication No. 10-27127
Patent Document 6: Japanese Laid-open Patent Publication No. 11-7401
Patent Document 7: Japanese Laid-open Patent Publication No. 2015-60275
Patent Document 8: Japanese Laid-open Patent Publication No. 2015-92420

In recent years, as for storage apparatuses, researches have been conducted on software defined storages (SDSs), and development of new scale-out storage apparatuses has been proceeding, for example.

For managing the storage environment of a storage system by a storage management apparatus in a comprehensive manner, it is effective to enable collections of performance information from scale-out storage apparatuses, as well as collections of performance information from conventional storage apparatuses.

Application of performance information obtainment processing that has been carried out on conventional storage apparatuses, to scale-out storage apparatuses in a storage management apparatus, however, may cause the following disadvantages.

(a) Excessive Network Load Caused by Increased Volume of Data Obtained from Apparatuses A storage management apparatus obtains the latest values of performance data (performance data items) in binary format from a storage controller that controls storage apparatuses, calculates statistics (e.g., differences and sums), writes them in files in a text format to retain as performance information, for example. Data lengths of binary performance data items are four or other bytes for integer data types, or are eight or other bytes for double precision data types, for example. An example of the text format includes comma separated values (CSV) format, for example.

The size of performance data increases as the number of parts (e.g., volumes) configuring a storage apparatus increases. For a scale-out storage apparatus having the maximum number of parts (about 65,000 parts) allowed in the specification, the size of performance data obtained from such a scale-out storage apparatus during a single obtainment may exceed 50 megabytes. Accordingly, in scale-out storage apparatuses, communication delays and the like may frequently occur due to congestions on networks caused by transfer of large volume data, which may make a management of the entire system by a storage management apparatus difficult.

(b) Consumption of Excessive Disk Space for Saving CSV Files.

A storage management apparatus obtains a performance data record that has been retained in a storage controller in programmably-computable binary format, and converts it into strings in CSV format for retaining the record. As a result, data is retained redundantly, which contributes to a lower storage efficiency.

For example, considering scale-out storage apparatuses in the maximum configuration, a storage management apparatus collects a record of 50 megabytes in every cycle of obtainment processing (e.g., in every 600 seconds), and retains the record during a preservation duration (e.g., 90 days). In this case, disk space of as much as 700 gigabytes will be occupied, and hence the usage of storing areas in the storage management apparatus will increase.

(c) Occurrence of Load for Deletion Processing for Data Outliving Beyond a Preservation Lifetime.

For example, performance information (performance information items) has a preservation lifetime such that a storage management apparatus searches the file system for CSV files having performance information items outliving beyond the preservation lifetime, to delete the expired CSV files. As a result, as the number and the data sizes of files of performance information increase, the processing load on the storage management apparatus for the deletion processing of the performance information increases.

As set forth above, depending on the scales (configurations) of storage apparatuses, obtainment processing of performance information from storage apparatuses by a storage management apparatus may become inefficient.

SUMMARY

According to an aspect of the embodiments, a storage management apparatus may include a memory and a processor coupled to the memory. The processor may be configured to receive state information regarding a state of a storage apparatus sent from the storage apparatus, and identify a type of the storage apparatus based on a result of reception of the state information. The processor may also be configured to execute first processing to receive, when the identified type of the storage apparatus is a first storage apparatus, first performance information regarding a performance of the first storage apparatus sent from the first storage apparatus, and store the received first performance information in a database as data of a table coordinating the received first performance information for each time period of reception. The processor may also be configured to execute second processing to receive, when the identified type of the storage apparatus is a second storage apparatus, second performance information regarding a performance of the second storage apparatus sent from the second storage apparatus, and store the received second performance information in the memory as data of a text-format file. The processor may also be configured to switch between an execution of the first processing and an execution of the second processing depending on the identified type of the storage apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram depicting an example of performance information depicted in FIG. 2;

FIG. 4 is a diagram depicting an example of an administration table depicted in FIG. 2;

FIG. 13 is a diagram depicting an example of statuses of a performance management function in accordance with one embodiment;

FIG. 17 is a block diagram depicting an example of a hardware configuration of a computer in accordance with one embodiment.

DESCRIPTION OF EMBODIMENTS

Figure 1:
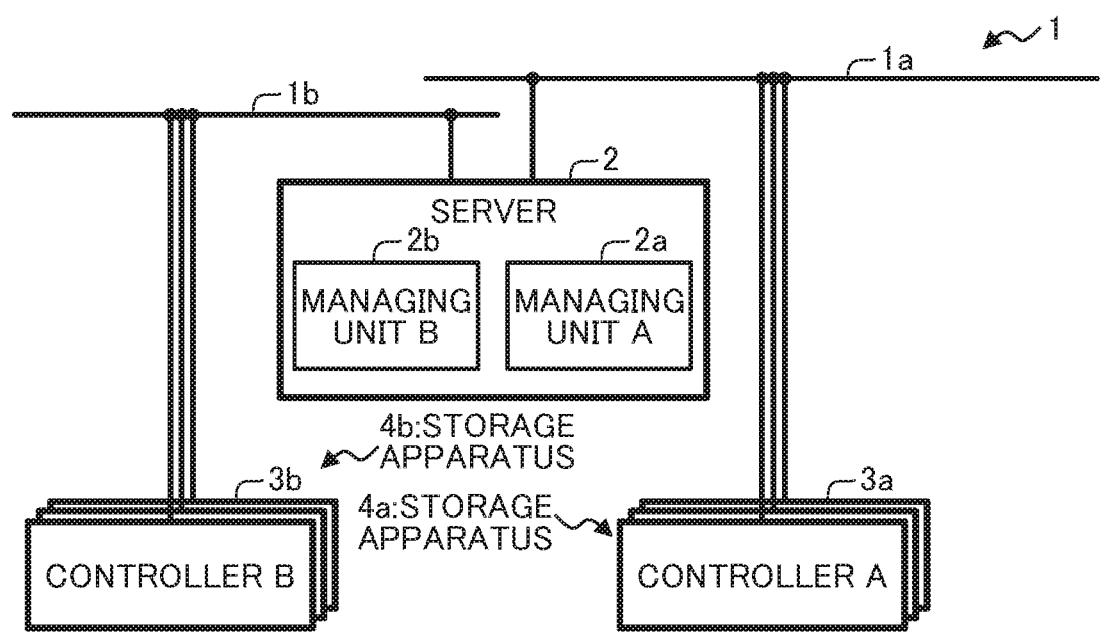
FIG. 1 is a block diagram depicting an example of a configuration of a storage system in accordance with one embodiment.

Hereinafter, embodiments of the present disclosure will be described with reference to the drawings. Note that the embodiments described below are merely exemplary, and it is not intended to exclude a wide variety of modifications to and applications of techniques that are not described explicitly in the following. For example, the present embodiment may be practiced in various modifications without departing from the spirit thereof. Note that elements referenced to by the same reference symbols in the drawings mentioned in the following descriptions denote the same or similar elements, unless otherwise stated.

(1) One Embodiment

In one embodiment, a technique to implement obtainment processing of performance information from storage apparatuses by a storage management apparatus in an efficient manner, will be described.

(1-1) Example of Configuration of Storage System in Accordance with One Embodiment As depicted in FIG. 1, a storage system 1 in accordance with one embodiment may include a server 2 as one example of a storage management apparatus, and controllers 3a and 3b as examples of storage controllers. Note that FIG. 1 illustrates the block diagram focusing on functional blocks related to obtainment processing of performance information, and other functional blocks, such as those used for operations related to other managements by the server 2 and business operations in the storage system 1, are omitted.

The server 2 is communicatively connected to each other to one or more controllers 3a via a network 1a, such as a local area network (LAN), and is also communicatively connected to each other to one or more controllers 3b via a network 1b, such as a LAN. Note that the networks 1a and 1b may be a single network (a network shared between storage apparatuses 4a and 4b).

Each controller 3a is one example of a first storage controller configured to control a storage apparatus 4a, and each controller 3b is one example of a second storage controller configured to control a storage apparatus 4b. In one embodiment, one or more storage apparatuses 4a may be scale-out storage apparatuses, to which storages (storing apparatuses having storing areas; not illustrated) can be added, and are examples of a first storage apparatus. On the contrary, in one embodiment, one or more storage apparatuses 4b may be conventional storage apparatuses, and are examples of a second storage apparatus.

Thus, the server 2 may include managing units 2a and 2b that manage the storage apparatuses 4a and 4b having different product specifications associated with the apparatus scale, in other words, of different classifications (models). Note that the storage system 1 may include multiple storage apparatuses 4a, and may be configured without any storage apparatus 4b.

Hereinafter, when no distinction is made between the controllers 3a and 3b, they are simply referred to as "controllers 3". When no distinction is made between the storage apparatuses 4a and 4b, they are simply referred to as "storage apparatuses 4".

In the following descriptions, when a reference is made to a unit or functional block related to scale-out storage apparatuses 4a, the name of the unit or functional block followed by the letter "A" may be used in place of the reference symbol thereof. On the contrary, when a reference is made to a unit or functional block related to conventional storage apparatuses 4b, the name of the unit or functional block followed by the letter "B" may be used in place of the reference symbol thereof. As used therein, the term an element "related to the storage apparatus 4" may mean that that element may be included in the storage apparatus 4, or may process the storage apparatus 4.

Each controller 3a provides a business server (not illustrated) and the like, with storing areas in a storage apparatus 4a via a network, such as the storage area network (SAN). Each controller 3b provides a business server (not illustrated) and the like, with storing areas in a storage apparatus 4b via an unillustrated network 1b, such as the SAN. Although storages (storing apparatuses having storing areas) provided in the storage apparatuses 4 are not illustrated in FIG. 1, the storage apparatuses 4 may include multiple storages connected to the storage apparatuses 4 via a network, such as the SAN, for example.

(1-1-1) Example of Configuration of Server

Figure 2:
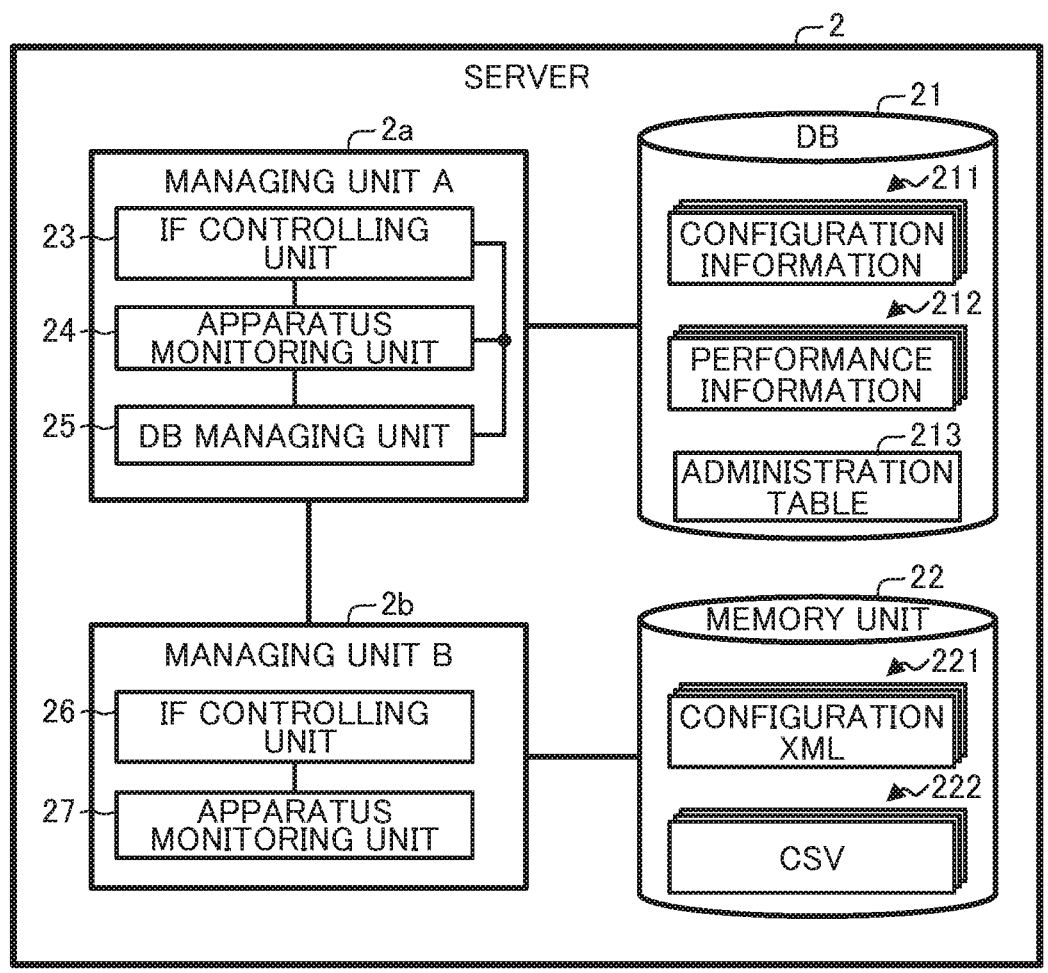
FIG. 2 is a block diagram depicting an example of a functional configuration of a server in accordance with one embodiment.

As depicted in FIG. 2, the server 2 as one example of the storage management apparatus may include a database (DB) 21, a memory unit 22, and the managing units 2a and 2b, for example, when focusing on the functions to carry out obtainment processing of performance information in accordance with one embodiment.

The DB 21 is one example of a database used to manage the storage apparatuses 4a by the managing unit 2a, and may store configuration information 211, performance information 212, and an administration table 213, for example. The DB 21 is one example of a repository, and may be a database management system, such as PostgreSQL, for example.

The configuration information 211 is information regarding the configuration of each storage apparatus 4a. The configuration information 211 corresponds to a part of information in apparatus information 311 (refer to FIG. 5) retained in a controller 3a, and may be obtained from the controller 3a and updated at certain timing (e.g., in performance information obtainment processing).

The performance information 212 is a collection of multiple tables managed in the DB 21, which accumulate first performance information regarding performances of each storage apparatus 4a obtained from the controller 3a. The performance information 212 is used in the server 2 to provide users with information usable in performance analyses of the storage system 1, to monitor the performances of the storage system 1, and the like, for example.

As depicted in FIG. 3, the performance information 212 may include partition tables divided for respective performance classifications, such as tables 212a regarding performances of storages and tables 212b regarding nodes, for each of the apparatuses 4, for example. In addition to the tables 212a and 212b described above, the performance information 212 may include additional partition tables for ports, central processing units (CPUs), CPU cores, drives, storage pools, volumes, and the like, for example. Hereinafter, partition tables are referred to as "PTs".

As depicted in FIG. 3, each table 212a, as one example of a PT, may include time stamps and various performance data (performance data items). The performance data items may include performance data items regarding reads, writes, reads and writes, caches, CPU performances, temperatures, and the like. Note that performance data items depicted in FIG. 3 are merely exemplary and the performance information 212 may include a wide variety of data items, including more detailed performance data items and the like.

In addition, performance data (performance data items) may include several types, such as performance data for users, performance data for developers (e.g., data for failure examinations for hardware developers), and performance data for both the users and the developers, for example. Note that performance data not used in the management function for the storage apparatuses 4 by the server 2, such as auxiliary data for failure examinations (e.g., performance data for developers), may be stored in the performance information 212 as byte sequences of a compressed file, for example, as will be described later.

Here, in one embodiment, in the performance information 212, performance data items obtained or measured during a time period (e.g., on one (1) day) corresponding to the unit term for deleting PTs at once (e.g., PTs for one day) may be organized into a single PT, for each performance classification. In other words, the performance information 212 may be organized into tables for the respective time periods during which performance data items are obtained. For example, each PT (as one example, a table 212a regarding performances of a storage) may be managed in a table for each deletion unit term (e.g., one day) such that the total of seven (7=preservation duration (e.g., seven days)/deletion unit term (e.g., one day)) tables exist.

As set forth above, the time-wise unit term for storing PTs in the performance information 212 (storage unit term to store PTs) is matched with or approximately matched with the unit term for deleting the PTs at once (PTs that are to be deleted at once due to expiration of the preservation duration). As a result, the management of updates and deletions of the performance information 212 is simplified, as will be described later, and hence the processing loads on the server 2 can be mitigated. Although it is assumed that the time-wise storage unit term of PTs is one (1) day in the following descriptions for the sake of brevity, this is not limiting. The storage unit term may be several hours, for example, depending on storing areas in the server 2 or the size of performance data to be collected. Further, even when the storage unit term is set to one day, performance data may be collected regularly (e.g., in every 10 minutes).

In other words, it can be regarded that the DB 21 stores a plurality of performance data items received by the managing unit 2a from the controllers 3a in data of a table, the table coordinating (organizing) the plurality of performance data items for the respective reception time periods and for the respective performance classifications.

The administration table 213 is information used for administrating PTs in the performance information 212. As depicted in FIG. 4, the administration table 213 may include entries of the partition table name (PT name), the storage identifier, the resource type (Resource_Type), the start time (Start_Time), the end time (End_Time), and the last update time (Last_Update), for example.

A PT name includes a name of a PT. In one embodiment, as exemplified in FIG. 4, a name of a PT may include the string of "performance" indicating a performance, the string of "xxxxxx" indicating the storage identifier, the string of "storages" indicating the resource type (as one example), and the string of "part_20171001" indicating the storage unit term (as one example). Note that a storage identifier may include an identifier unique to each storage apparatus 4a. The resource type may include the classification of the performance that is indicated by that table. The storage unit term may have the format of "year/month/day" or "year/month/day and time (in hours)", indicating the timing associated with the time when performance data items within that table were received or measured (in a controller 3a), for example.

The same information as the information included in a PT name may be set to the storage identifier and the resource type. The start time, the end time, and the last update time of obtainments or measurements of performance data items associated with (included in) the storage unit term of the PT name may be set to the start time, the end time, and the last update time. Information on the storage identifier, the resource type, the start time, the end time, and the last update time may be used in a search of PTs by the managing unit 2a, which will be described later.

The memory unit 22 is a storing area used to manage the storage apparatuses 4b by the managing unit 2b, and may store a configuration extensible markup language (XML) 221 and a CSV 222, for example. Note that the memory unit 22 may be omitted when the storage system 1 has no storage apparatus 4b.

The configuration XML 221 is information regarding the configuration of each storage apparatus 4b. The configuration XML 221 corresponds to a part of information on apparatus information 331 (refer to FIG. 6) retained in a controller 3b, and may be obtained from the controller 3b and updated at certain timing (as one example, in performance information obtainment processing).

The CSV 222 is multiple files in CSV format, which accumulate second performance information regarding performances of each storage apparatus 4b obtained from the controller 3b. The CSV 222 is used in the server 2 to provide users with information usable in performance analyses of the storage system 1, to monitor the performance of the storage system 1, and the like, for example.

The DB 21 and the memory unit 22 may be embodied by storing areas, such as volatile memories, storing apparatuses, and flash memories. Examples of the volatile memories are random access memories (RAMs), for example. Examples of the storing apparatuses include magnetic disk apparatuses, such as hard disk drives (HDDs), and solid state drive apparatuses, such as solid state drives (SSDs), for example.

The managing unit 2a manages the storage apparatuses 4a. Note that the managing unit 2a may identify whether a storage apparatus 4, with which the managing unit 2a is communicating, is a storage apparatus 4a or 4b, and may delegate its processing to the managing unit 2b if the communication counterpart is a storage apparatus 4b. As depicted in FIG. 2, the managing unit 2a may include an interface (IF) controlling unit 23, an apparatus monitoring unit 24, and a DB managing unit 25, for example.

The IF controlling unit 23 controls communication IFs with the controllers 3a. For example, the IF controlling unit 23 may control communications with (each of) the controllers 3a via a framework of the Representational State Transfer (REST) application programming interface (API).

The apparatus monitoring unit 24 monitors the storage apparatuses 4. For example, the apparatus monitoring unit 24 may control switching of performance information obtainment processing between the controllers 3a and 3b, performance information obtainment processing on the controllers 3a, and the like, by means of a monitor thread.

The DB managing unit 25 manages the performance information 212 in the DB 21. For example, the DB managing unit 25 may wait as a management API for the performance information 212, start a management thread in response to an instruction from the apparatus monitoring unit 24, and update or otherwise modify the performance information 212 by means of the management thread.

The managing unit 2b manages the storage apparatuses 4b. As depicted in FIG. 2, the managing unit 2b may include an IF controlling unit 26 and an apparatus monitoring unit 27, for example.

The IF controlling unit 26 controls communication IFs with the controllers 3b. For example, the IF controlling unit 26 may control communications with (each of) the controllers 3b via the Network Installation Management (NIM)-Private Certified Connection (PCC), or a command line interface (CLI), or the like.

The apparatus monitoring unit 27 monitors the storage apparatuses 4b. For example, the apparatus monitoring unit 27 may control performance information obtainment processing on the controllers 3b by means of a monitor thread.

(1-1-2) Example of Configuration of Controller A

Figure 5:
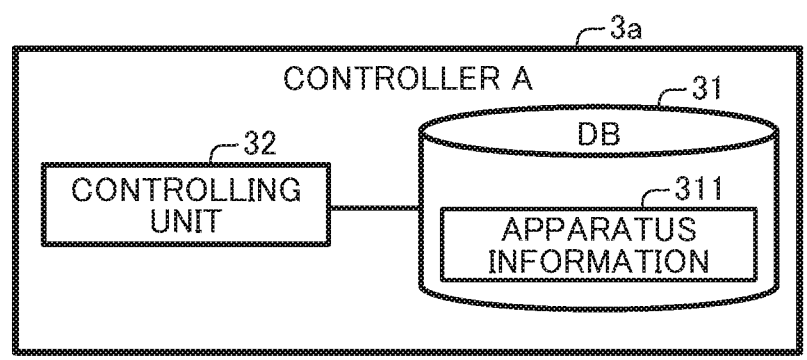
FIG. 5 is a block diagram depicting an example of a functional configuration of a controller A in accordance with one embodiment.

As depicted in FIG. 5, a controller 3a (controller A) in a storage apparatus 4a may include a DB 31 and a controlling unit 32, for example.

The DB 31 is one example of a repository, and may be a database management system, such as PostgreSQL, for example. In FIG. 5, information regarding the storage apparatus 4a among information managed as a repository is denoted as "apparatus information 311". The apparatus information 311 may include configuration data regarding the configuration of the storage apparatus 4a, and performance data regarding performances of the storage apparatus 4a, for example. The data structure of the DB 31 may have a data structure that is different from that of the DB 21 in the server 2, or may have the same data structure as that of the DB 21 in the server 2. In addition to the apparatus information 311, the DB 31 may store various control tables used in controls of the storage apparatus 4a, as a repository.

The DB 31 may be embodied by storing areas, such as volatile memories, storing apparatuses, and flash memories.

The controlling unit 32 is embodied by firmware or the like in the controller 3a, and carries out various controls on the controller 3a. The controlling unit 32 may have functions, such as a communication function with the server 2 and update and extraction functions of performance data on and from the DB 31, for example, when focusing on functions to carry out performance information obtainment processing in accordance with one embodiment.

(1-1-3) Example of Configuration of Controller B

Figure 6:
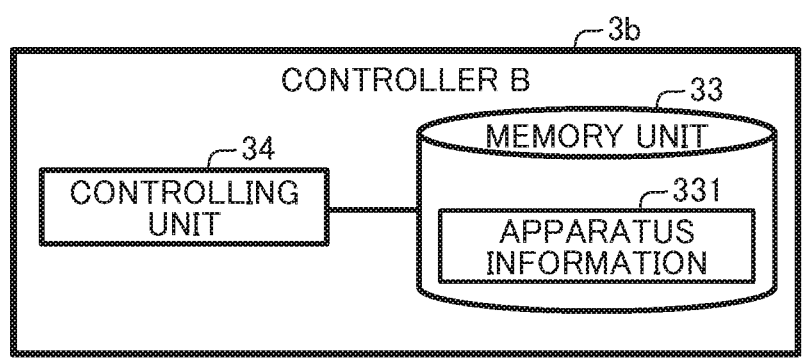
FIG. 6 is a block diagram depicting an example of a functional configuration of a controller B in accordance with one embodiment.

As depicted in FIG. 6, a controller 3b in a storage apparatus 4b (controller B) may include a memory unit 33 and a controlling unit 34, for example.

The memory unit 33 stores apparatus information 331 regarding the storage apparatus 4b. The apparatus information 331 may include configuration data regarding the configuration of the storage apparatus 4b, and performance data regarding performances of the storage apparatus 4b, for example. In one embodiment, data of the apparatus information 331 may be stored and managed as data in binary format and the like. In addition to the apparatus information 331, the memory unit 33 may store various control tables used in controls of the storage apparatus 4b.

The memory unit 31 may be embodied by storing areas, such as volatile memories, storing apparatuses, and flash memories.

The controlling unit 34 is embodied by firmware or the like in the controller 3b, and carries out various controls on the controller 3b. The controlling unit 34 may have functions, such as a communication function with the server 2 and update and extraction functions of performance data on and from the memory unit 33, for example, when focusing on functions to carry out performance information obtainment processing in accordance with one embodiment.

(1-2) Example of Operations

Next, an example of operations by the storage system 1 configured as described above will be described.

Figure 7:
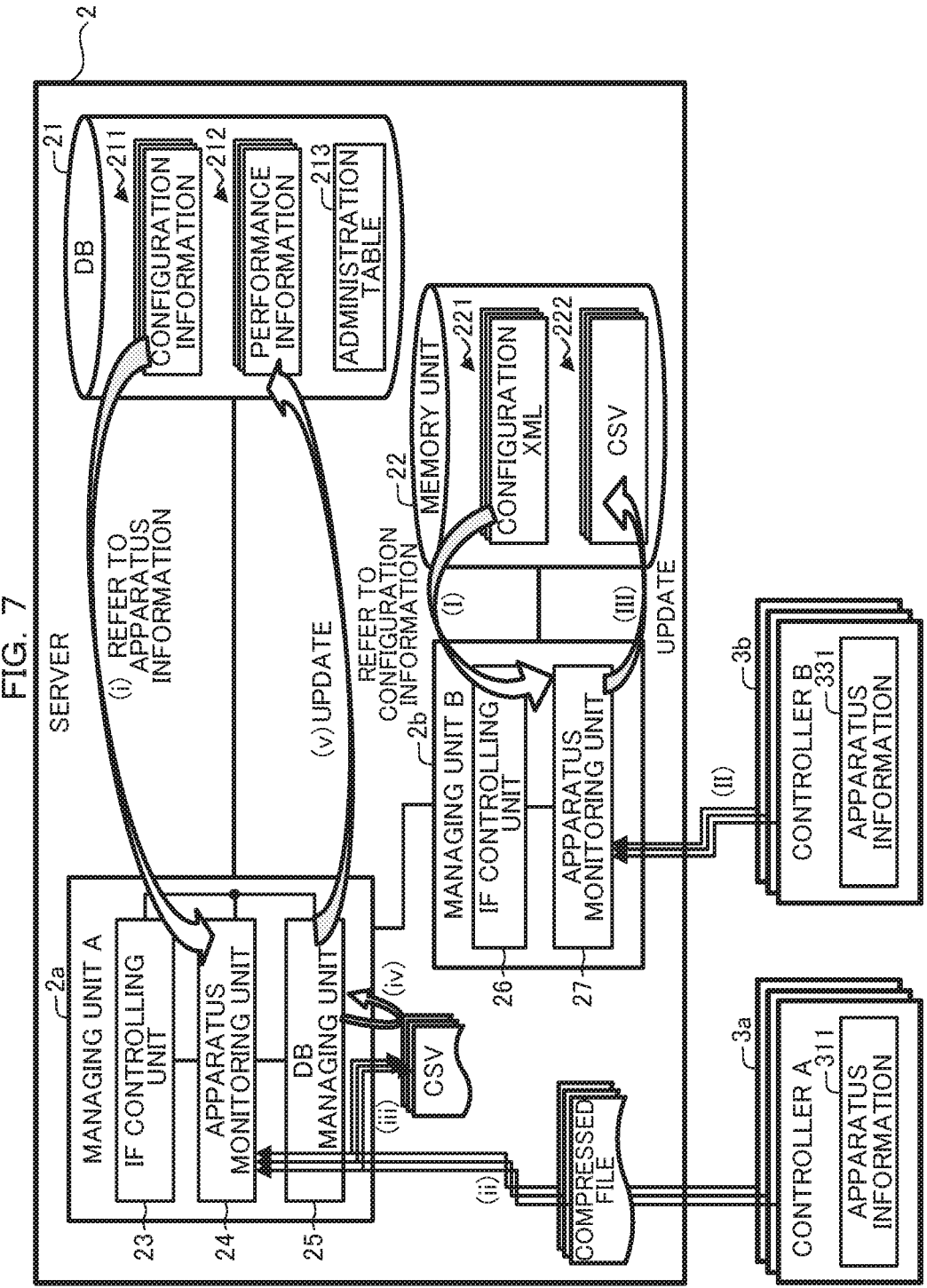
FIG. 7 is a diagram illustrating an example of operations of the entire storage system in accordance with one embodiment.

Firstly, referring to FIG. 7, an example of operations of performance information obtainment processing will be described briefly. As exemplified in FIG. 7, the apparatus monitoring unit 24 in the managing unit 2a refers to apparatus information in the configuration information 211 (refer to (i)), and obtains user settings for storage apparatuses 4a, from which performance data is to be obtained. The user settings may include settings, such as those as to whether a performance management is enabled or disabled, whether the performance data is to be obtained or not, and a duration (in days) to retain the performance data. When it is determined based on the user settings that the performance data is to be obtained, the apparatus monitoring unit 24 then sends an obtainment request for performance information to each of the controllers 3a in one or more storage apparatuses 4a.

In response to the request from the apparatus monitoring unit 24, the controller 3a in each storage apparatus 4a extracts, from the apparatus information 311, performance data items in text format (e.g. in CSV format) for each performance classification, and generates a compressed file by compressing the extracted performance data items into a single file. The controller 3a sends information on the generated compressed file to the apparatus monitoring unit 24 (refer to (ii)).

The apparatus monitoring unit 24 stores the received compressed file in a certain storing area. The DB managing unit 25 decompresses (expands) the compressed file (refer to (iii)) to obtain (calculate) performance data items in CSV format (refer to (iv)).

Using the obtained performance data items, the DB managing unit 25 updates the performance information 212 (e.g., the DB managing unit 25 inserts the performance data items into a PT), for each categories of the storage, the performance classification, and the storage unit term (e.g., date) (refer to (v)). Upon updating the performance information 212, the DB managing unit 25 may refer to the administration table 213 to determine whether an existing PT is to be updated or a new PT is to be created, and may update the administration table 213 in accordance with an update of the performance information 212.

In the meantime, the apparatus monitoring unit 27 refers to configuration information in the configuration XML 221 (refer to (I)), and obtains user settings for storage apparatuses 4b, from which performance data is to be obtained. The user settings may include the same settings as the user settings for the storage apparatuses 4a. When the performance data is to be obtained based on the user settings, the apparatus monitoring unit 27 then sends an obtainment request for performance information to each of the controllers 3b in one or more storage apparatuses 4b.

In response to the request from the apparatus monitoring unit 27, the controller 3b in each storage apparatus 4b extracts performance data items from the apparatus information 331, and includes the extracted performance data items into a response data. The controller 3b then sends information on the generated response data to the apparatus monitoring unit 27 (refer to (II)).

The apparatus monitoring unit 27 updates the CSV 222 based on the received response (e.g., by converting the response to the CSV format) (refer to (III)).

(1-2-1) Performance Information Obtainment Processing

Next, referring to FIGS. 8-12, an example of operations of performance information obtainment processing will be described, which is carried out as periodical processing in the storage system 1. Note that the performance information obtainment processing as periodical processing may be carried out by a monitor thread in the apparatus monitoring unit 24 at execution timing of the periodical processing. The execution timing of the periodical processing may be a cycle of about 600 seconds (10 minutes), for example.

Figure 8:
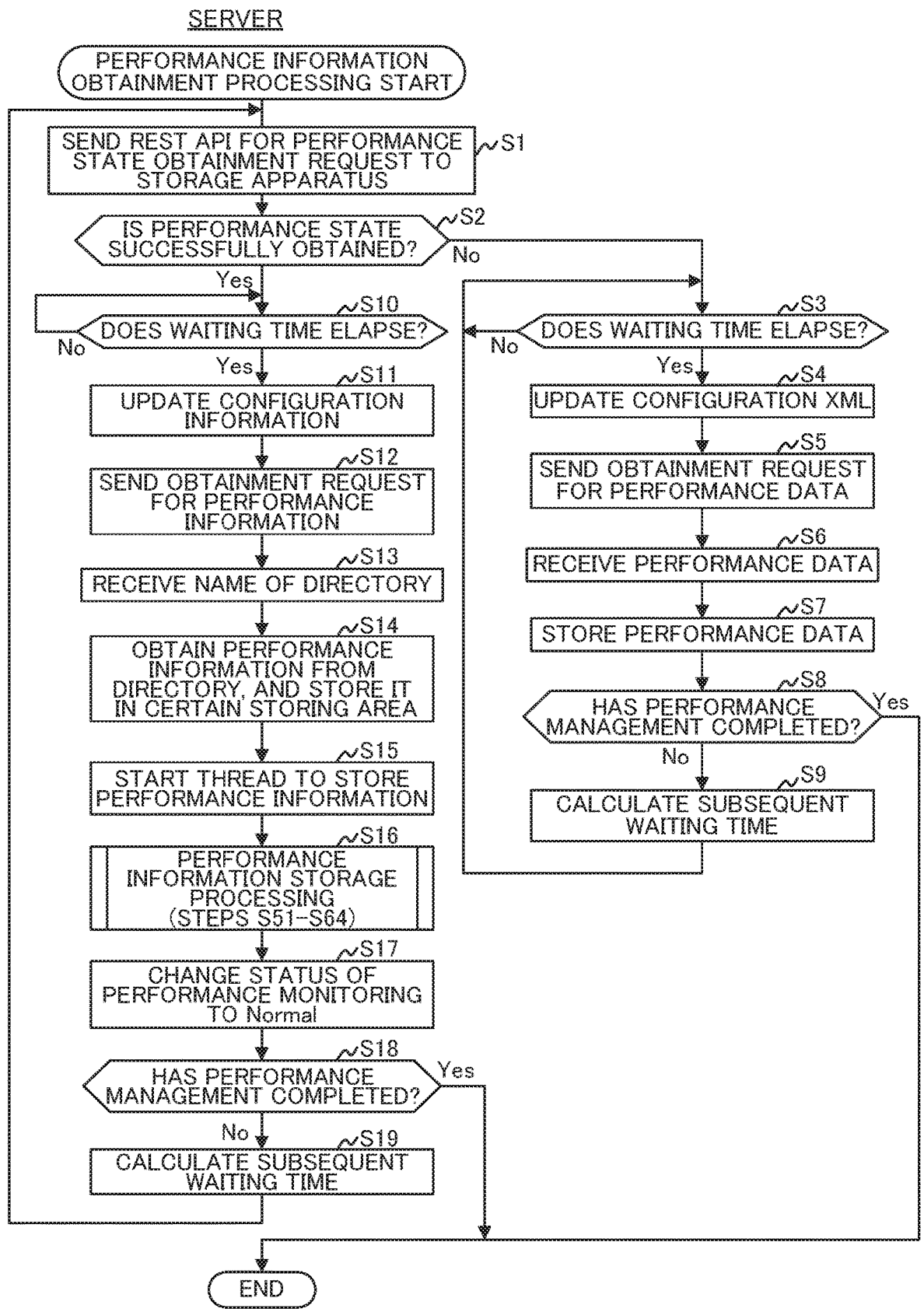
FIG. 8 is a flowchart illustrating an example of operations of performance information obtainment processing in accordance with one embodiment.

As exemplified in FIG. 8, in the server 2, the apparatus monitoring unit 24 in the managing unit 2a refers to the configuration information 211 to issue a REST API for a performance state obtainment request, to one or more storage apparatuses 4 (e.g., every storage apparatus 4 connected to the server 2). The IF controlling unit 23 sends the request to the storage apparatuses 4 via the networks 1a and 1b through the framework of the REST API (Step S1).

Figure 9:
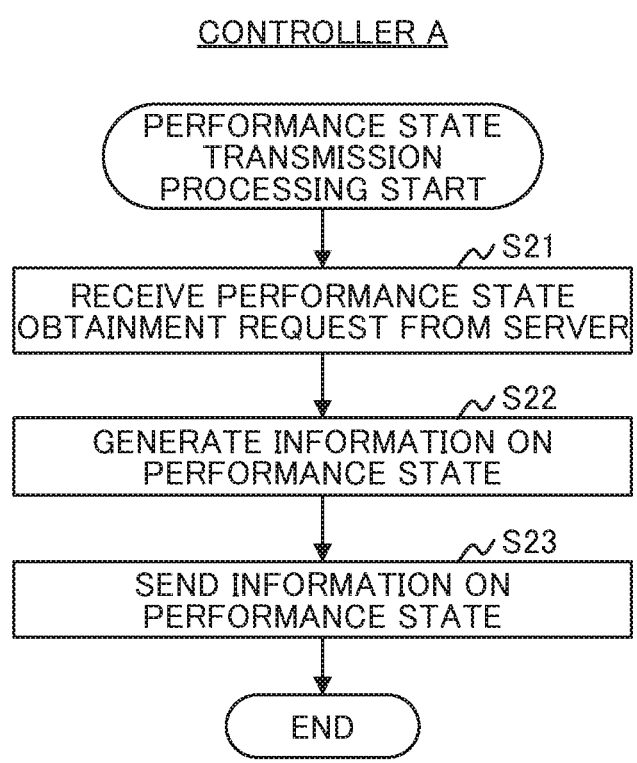
FIG. 9 is a flowchart illustrating an example of operations of performance state transmission processing in accordance with one embodiment.

As exemplified in FIG. 9, in performance state transmission processing, in response to receiving the performance state obtainment request from the server 2 (Step S21), the controlling unit 32 in each controller 3a generates information on the performance state (Step S22). The controlling unit 32 then sends the generated information on the performance state to the server 2 (Step S23). Note that performance state is one example of state information, and may be information on an apparatus state (status) of a storage apparatus 4a or a controller 3a, for example.

Referring back to the descriptions of FIG. 8, the apparatus monitoring unit 24 in the server 2 determines whether or not information on the performance state has been successfully obtained (received) from the controller 3 via the IF controlling unit 23 (Step S2). The determination result as to whether or not the information on the performance state from the controller 3 has been successfully obtained (received) can be regarded as an identification result of the type of the storage apparatus 4.

A failure in successfully receiving information on the performance state (No from Step S2) indicates that the controller 3, to which the performance state obtainment request was sent, is a controller 3b in a storage apparatus 4b not supporting the REST API (where the obtainment request could not be received). On the contrary, a successful obtainment of information on the performance state (Yes from Step S2) indicates that the controller 3, to which the performance state obtainment request was sent, is a controller 3a in a storage apparatus 4a supporting the REST API.

Therefore, the apparatus monitoring unit 24 executes processing by the managing unit 2a if information on the performance state is successfully obtained, whereas the apparatus monitoring unit 24 makes the managing unit 2b execute processing if information on the performance state has not been successfully obtained.

As set forth above, the apparatus monitoring unit 24 is one example of an identifying unit configured to receive state information regarding the state of a storage apparatus 4 sent from the storage apparatus 4, and identify the type of the storage apparatus 4 based on a result of reception of the state information. The apparatus monitoring unit 24 is also one example of a switching unit configured to switch between an execution of performance information obtainment processing as first processing by the managing unit 2a, and an execution of performance information obtainment processing as second processing by the managing unit 2b, depending on the identified type of the storage apparatus 4.

In Step S2, if information on the performance state has not been successfully obtained (No from Step S2), the apparatus monitoring unit 24 instructs the managing unit 2b to execute performance information obtainment processing for the controller B, on the storage apparatus 4b. The apparatus monitoring unit 27 in the managing unit 2b waits until waiting time elapses (Step S3 and No from S3).

Once the waiting time elapses (Yes from Step S3), the apparatus monitoring unit 27 updates the configuration XML 221 (Step S4). In the update processing for the configuration XML 221, for example, the apparatus monitoring unit 27 may send an obtainment request for configuration information to the controller 3b via the IF controlling unit 26, and may receive, from the controller 3b, the configuration information that has been extracted from the apparatus information 331 and sent in the controller 3b. The apparatus monitoring unit 27 then may update the configuration XML 221 based on the received configuration information.

Subsequently, the apparatus monitoring unit 27 sends an obtainment request (e.g., command) for performance data to the controller 3b via the IF controlling unit 26 (Step S5).

Figure 10:
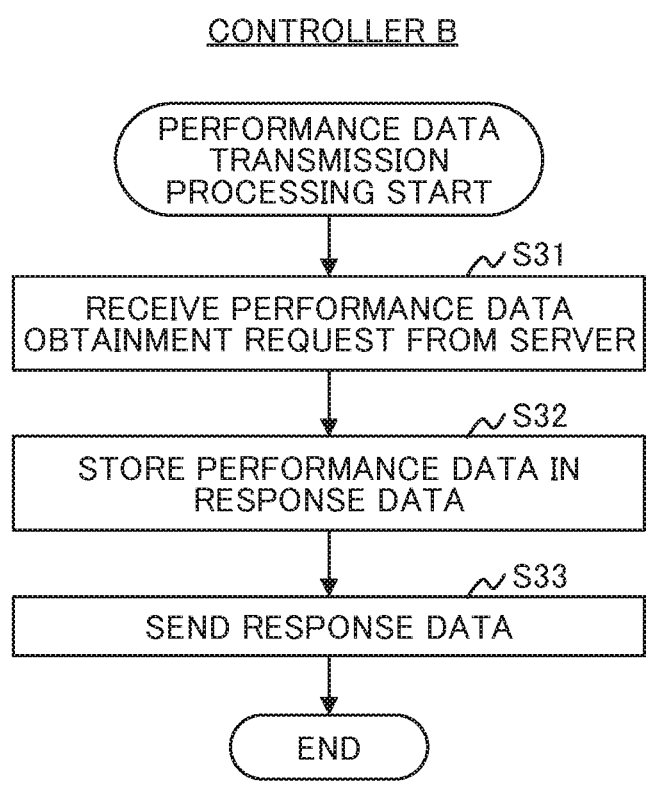
FIG. 10 is a flowchart illustrating an example of operations of performance data transmission processing in accordance with one embodiment.

As exemplified in FIG. 10, in performance data transmission processing, in response to receiving the obtainment request for performance data from the server 2 (Step S31), the controlling unit 34 in the controller 3b extracts performance data items from the apparatus information 331, and includes them into response data (Step S32). The controlling unit 34 then sends the response data to the server 2 (Step S33).

Referring back to the descriptions of FIG. 8, the apparatus monitoring unit 27 receives the performance data items from the controller 3b via the IF controlling unit 26 (Step S6), and stores the received performance data items in a certain storing area (Step S7). Note that the stored performance data items are written into the CSV 222 in performance information storage processing, which will be described later.

The apparatus monitoring unit 27 determines whether or not the performance management has been completed on all of the storage apparatuses 4b from which performance information is to be obtained (Step S8). If not (No from Step S8), the apparatus monitoring unit 27 calculates the subsequent waiting time (Step S9) and the processing transitions to Step S3.

The waiting time is time to wait until performance information obtainment processing is carried out on a storage apparatus 4b for which the performance management has not been completed yet, after the determination in Step S8, for example. The waiting time may be adjusted considering the actual time consumed in performance data obtainment processing from a controller 3b, for example. In this manner, by providing the waiting time, the network 1b is prevented from being continuously occupied for longer time, and it is possible to achieve communication load balancing on the network 1b. In addition, even when the processing time of performance data obtainment processing varies under the influence of the data size of performance data and the status of the network, any variation in time can be adjusted (equalized) by adjusting the waiting time as a variable value. As a result, it is possible to initiate the subsequent performance data obtainment processing at periodical start time.

Otherwise, if the performance management has been completed on all of the storage apparatuses 4b (Yes from Step S8), the performance information obtainment processing as periodical processing ends.

In Step S2, if information on the performance state is successfully obtained from the controller 3a (Yes from Step S2), the apparatus monitoring unit 24 executes obtainment processing for performance information for the controller A, on the storage apparatus 4a.

The apparatus monitoring unit 24 waits until waiting time elapses (Step S10 and No from S10). Once the waiting time elapses (Yes from Step S10), the apparatus monitoring unit 24 updates the configuration information 211 (Step S11). In the update processing in the configuration information 211, for example, the apparatus monitoring unit 24 may send an obtainment request for configuration information to the controller 3a via the IF controlling unit 23, and may receive, from the controller 3a, configuration information extracted from the apparatus information 311 in the controller 3a. The apparatus monitoring unit 24 then may update the configuration information 211 based on the received configuration information.

Subsequently, the apparatus monitoring unit 24 issues a REST API for a performance information obtainment request to the controller 3a. The IF controlling unit 23 sends the request to the controller 3a via the network 1a through the framework of the REST API (Step S12).

Figure 11:
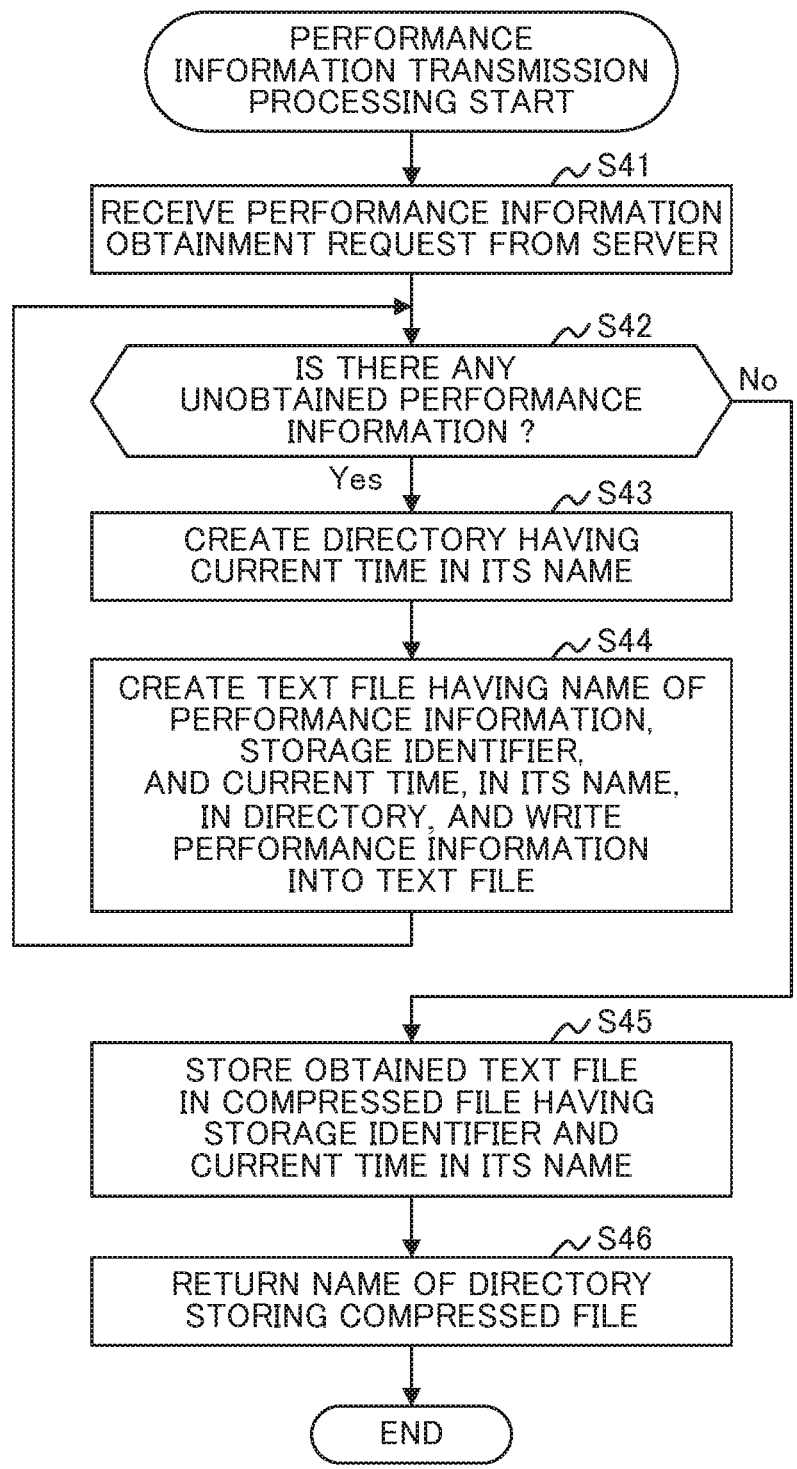
FIG. 11 is a flowchart illustrating an example of operations of performance information transmission processing in accordance with one embodiment.

As exemplified in FIG. 11, in performance information transmission processing, in response to receiving the performance information obtainment request from the server 2 (Step S41), the controlling unit 32 in the controller 3a determines whether or not there is any unobtained performance information item (Step S42).

If there is any unobtained performance information item (Yes from Step S42), the controlling unit 32 creates a directory in a certain storing area such that the name of the directory includes the current time (Step S43). The controlling unit 32 then creates a text file in the created directory such that the name of the text file includes the name of performance information item (e.g., performance classification), the storage identifier, and the current time, and writes the performance information item into that text file (Step S44). The processing then transitions to Step S42. An example of the text file includes a CSV file, for example. Note that the current time may be information on the year, month, and day, which are set to a PT name, for example.

Otherwise, if there is no unobtained performance information item in Step S42 (No from Step S42), the controlling unit 32 stores the obtained text file in a compressed file such that the name of the compressed file includes the storage identifier and the current time (Step S45).

The controlling unit 32 then returns (sends), to the server 2, the name of directory storing the compressed file (Step S46).

As set forth above, in the storage system 1, because the processing to convert performance data items in the DB 31 into text files is migrated (offloaded) to the side of the storage apparatuses 4a (to the side of the controllers 3a), the processing load on the server 2 can be mitigated.

In addition, in the controllers 3a, by sending multiple text files containing performance data items after compressing them, the data transfer volume can be reduced and the network load can be mitigated.

Referring back to the descriptions of FIG. 8, in response to receiving the name of the directory from the controller 3 via the IF controlling unit 23a (Step S13), the apparatus monitoring unit 24 obtains the compressed file from the directory and stores the obtained compressed file into a certain storing area (Step S14). Note that the processing by the apparatus monitoring unit 24 to obtain a compressed file from a directory in a controller 3a can be regarded as processing in which the controller 3a sends the compressed file in response to a request from the apparatus monitoring unit 24, and the apparatus monitoring unit 24 receives the compressed file.

The apparatus monitoring unit 24 then starts a performance information storing thread (Step S15). Once the thread is started, the DB managing unit 25 executes performance information storage processing by means of the started performance information storing thread (Step S16).

Figure 12:
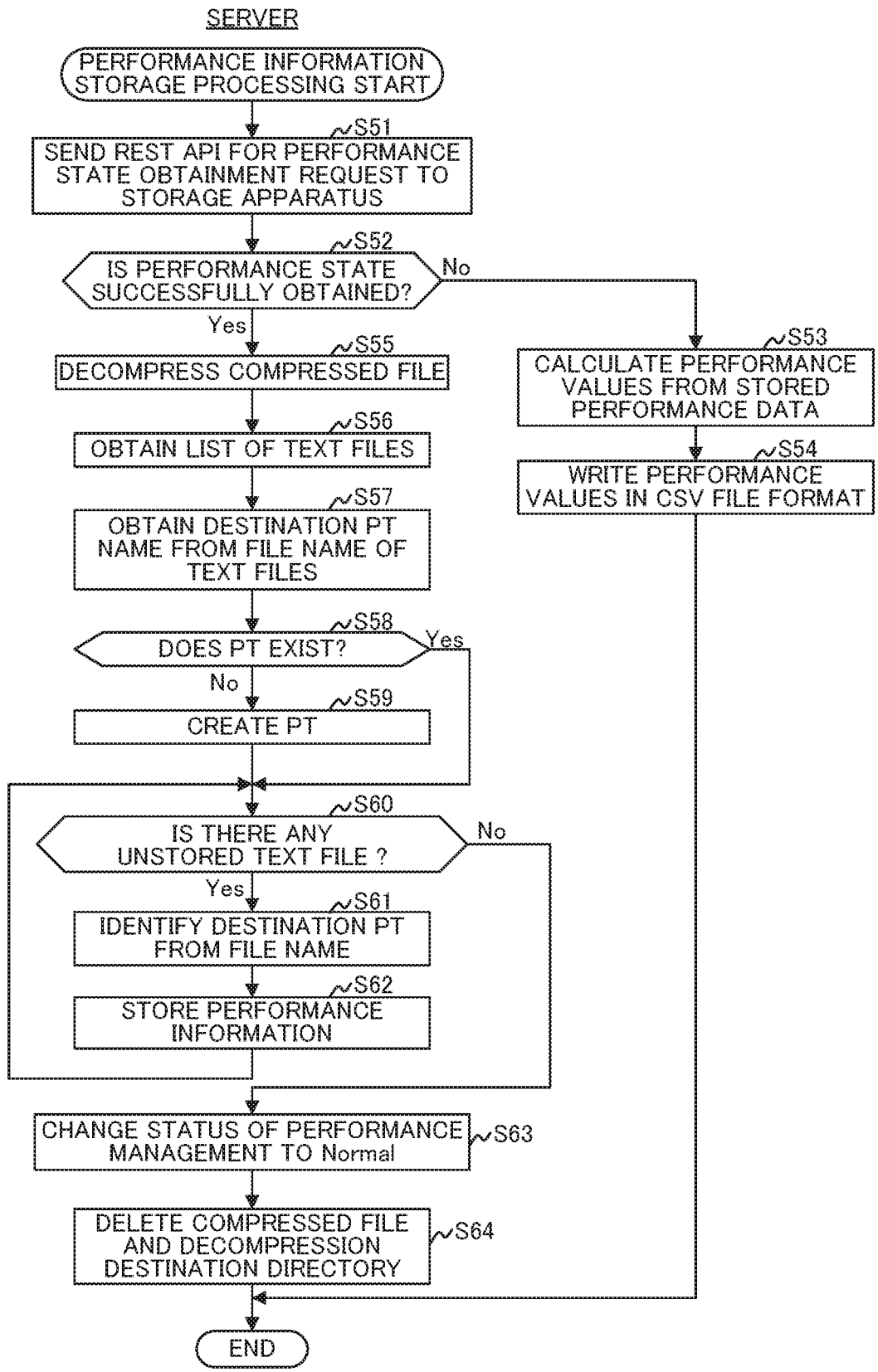
FIG. 12 is a flowchart illustrating an example of operations of performance information storage processing in accordance with one embodiment.

As exemplified in FIG. 12, in performance information storage processing, the DB managing unit 25 issues a REST API for a performance state obtainment request to the storage apparatuses 4 (e.g., every storage apparatus 4 connected to the server 2), by referring to the configuration information 211. The IF controlling unit 23 sends the request to the storage apparatuses 4 via the networks 1a and 1b through the framework of the REST API (Step S51).

The DB managing unit 25 determines whether or not information on the performance state is successfully obtained from a controller 3 via the IF controlling unit 23 (Step S52). A failure in successfully receiving information (No from Step S52) indicates that the controller 3, to which the performance state obtainment request was sent, is a controller 3b in a storage apparatus 4b not supporting the REST API.

In this case, the DB managing unit 25 instructs the apparatus monitoring unit 27 to execute performance information storage processing. In the performance information storage processing, the apparatus monitoring unit 27 calculates performance values from performance data items that were stored in Step S7 in FIG. 8 in the certain storing area (Step S53). The apparatus monitoring unit 27 then writes the calculated performance values in the memory unit 22, as data in a CSV format file (Step S54) and the performance information storage processing ends.

On the contrary, a successful obtainment of a performance state from a controller 3a in Step S52 (Yes from Step S52) indicates that the controller 3, to which the performance state obtainment request was sent, is a controller 3a in a storage apparatus 4a supporting the REST API.

In this case, the DB managing unit 25 decompresses the compressed file that was stored in the certain storing area in Step S14 (Step S55), and obtains (calculates) a list of text files (e.g., CSV files) (Step S56).

The DB managing unit 25 determines a PT name of a destination, from the file name of the text file (Step S57). As set forth above, the file name of the text file is set in the controller 3a so as to include the name of the performance information item (e.g., performance classification), the storage identifier, and the current time (e.g., year, month, and day). Accordingly, based on the file name of the text file, the DB managing unit 25 can readily identify (determine) a PT name to save the data included in that file.

Subsequently, the DB managing unit 25 determines whether or not a PT corresponding to the identified PT name exists in the performance information 212 by referring to the administration table 213 (Step S58). In this determination, for example, the DB managing unit 25 may search the administration table 213 (or logical table) for an entry of the identified PT name, to determine whether there is a hit or not.

If such a PT does not exist in the performance information 212 (No from Step S58), the DB managing unit 25 generates a PT having the identified PT name (Step S59), and the processing transitions to Step S60. Otherwise, if such a PT exists in the performance information 212 (Yes from Step S58), the processing transitions to Step S60.

In Step S60, the DB managing unit 25 determines whether or not there is any text file that has not been stored into a PT, in the list of text files.

If there is any unstored text file (Yes from Step S60), the DB managing unit 25 identifies a destination PT from the file name of the unstored text file (Step S61). The DB managing unit 25 then stores a performance information item in the unstored text file, into the identified PT (Step S62), and the processing transitions to Step S60.

Otherwise, if there is no unstored text file (No from Step S60), the DB managing unit 25 changes the status of the performance management to "Normal" (Step S63). The DB managing unit 25 then deletes the compressed file and the decompression destination directory (Step S64), and the performance information storage processing ends.

In this manner, the apparatus monitoring unit 24 and the DB managing unit 25 receive, from a controller 3a (a storage apparatus 4a), first performance information, which is compressed data wherein a plurality of performance data items are compressed for each performance classification by the controller 3a.

As set forth above, because the DB managing unit 25 stores performance data items in CSV format into the DB 21, which has a better storage efficiency, the usage of the disk space can be reduced and an increase in the usage of the disk space when storing the data in CSV format can be suppressed.

For example, a scale-out storage apparatus 4a in the maximum configuration is assumed. As one example, the managing unit 2a obtains performance information from the controller 3a in every cycle of obtainment processing (e.g., in every 600 seconds), and retains it during a preservation duration (e.g., 90 days). In this case, the occupied usage of the disk space is about 336 gigabytes, which means that the usage of the disk space can be suppressed to about 48% of the usage of disk space that may be occupied (700 gigabytes) in a conventional storage apparatus.

Note that the DB managing unit 25 may store auxiliary data, such as auxiliary data for failure examinations, for example, which is not used in the management function of the storage apparatuses 4a, in a PT in the performance information 212 as byte-sequence data, without decompressing a compressed file.

Techniques to distinguish whether or not data is auxiliary data for failure examinations, e.g., performance data for developers, include a wide variety of techniques.

As one example, the managing unit 2a may manage administration information indicating whether the performance data are for users, developers, or the both, for each item of the performance data. In this case, items corresponding to performance data for developers may be stored in the performance information 212, as byte-sequence data, where the data remain as a compressed file, or the entire data are decompressed and then only information on items corresponding to performance data for developers are compressed (recompressed).

Alternatively, as another example, the managing unit 2a may manage administration information indicating whether the performance data are for users, developers, or the both, for each performance classification (resource type). In this case, data of performance classifications corresponding to performance data for developers may be stored in the performance information 212 as byte-sequence data, where the data remain as a compressed file.

Obtainments of a list of files within a compressed file or a partial decompression of a compressed file may be embodied with a wide variety of well-known techniques.

The distinguishment processing of performance data for developers as described above may be carried out in the processing in Steps S55 and S56 depicted in FIG. 12, for example.

As set forth above, the DB managing unit 25 obtains at least one performance data item by decompressing at least a part of the received compressed data, and stores the obtained at least one performance data item in the DB 21, by storing the at least one performance data item in tables, for the respective obtainment time periods and for the respective performance classifications. In addition, the DB managing unit 25 stores performance data in a part not decompressed in the obtained compressed data, in the DB 21 as a compressed format.

As set forth above, because the DB managing unit 25 stores performance data items not used in the management function of the storage apparatuses 4a, in the DB 21 as byte sequences of a compressed file, the usage of the disk space can further be reduced and the storage efficiency can be enhanced.

Referring back to the descriptions of FIG. 8, when the performance information storage processing by the DB managing unit 25 ends, the apparatus monitoring unit 24 changes the status of the performance monitor to "Normal" (Step S17), and determines whether or not the performance management has been completed on all of the storage apparatuses 4a (Step S18).

If the performance management has not been completed for all of the storage apparatuses 4a (No from Step S18), the apparatus monitoring unit 24 calculates the subsequent waiting time (Step S19) and the processing transitions to Step S1.

The waiting time is time to wait until performance information obtainment processing is carried out on a storage apparatus 4a on which performance management has not been completed yet, after the determination in Step S18, for example. The waiting time may be adjusted considering the actual time consumed in performance data obtainment processing from a controller 3a, for example. As set forth above, by providing the waiting time, the network 1a is prevented from being continuously occupied for longer time, and it is possible to achieve communication load balancing on the network 1a. In addition, even when the processing time of performance data obtainment processing varies under the influence of the data size of performance data and the status of the network, any variation in time can be adjusted (equalized) by adjusting the waiting time as a variable value. As a result, it is possible to initiate the subsequent performance data obtainment processing at periodical start time.

Otherwise, if the performance management has been completed on all of the storage apparatuses 4a (Yes from Step S18), the performance information obtainment processing as periodical processing ends.

Note that the apparatus monitoring unit 24 and the DB managing unit 25 change the statuses of the monitor thread and the DB management thread in Step S17 in FIG. 8 and Step S63 in FIG. 12, respectively.

For example, the managing unit 2a may determine the status of the performance management function based on a combination of statuses of the threads, and may carry out status output processing, such as notifying an operator, writing into a log, and the like, depending on the status.

As one example, the monitor thread may have the statuses of "Normal", "Recovering", "Internal Error", "Stop", and the like. "Normal" indicates the normal operation, and "Recovering" indicates the status where no communication can be made from the managing unit 2a to the storage apparatus 4. "Internal Error" indicates that a download of information from the controller 3a has failed or a decompression of a compressed file has failed, and "Stop" indicates a stop of the operation under an instruction from the operator.

Furthermore, as one example, the DB management thread may have the statuses of "Normal", "Busy", "Internal Error", "Stop", and the like. "Normal" indicates the normal operation. "Busy" indicates the situation where a directory is filled with CSV files and processing by the DB management thread to insert performance data items within a CSV file into PTs has not been completed relative to waiting time. In this case, the apparatus monitoring unit 24 may set a longer value for the waiting time. "Internal Error" indicates an internal error, such as insufficient disk space upon writing to the DB 21 by means of the DB management thread, an access failure to the management system of the DB 21 (e.g., PostgreSQL), and the like. "Stop" indicates a stop of the operation under an instruction from the operator.

Based on combinations of the statuses described above, as exemplified in FIG. 13, the managing unit 2a may determine the status of the performance management function, and may carry out status output processing unless the status is "Monitoring", for example.

Using such a management of the statuses, an operator, for example, can readily distinguish an error among communication errors with a storage apparatus 4a or a controller 3a, internal errors of the managing unit 2a, failures caused by the relationship between waiting time and the DB 21, and the like, and can immediately take countermeasures for a recovery.

As set forth above, the managing unit 2a (e.g., the apparatus monitoring unit 24 and the DB managing unit 25) is one example of a first processing unit configured to execute performance information obtainment processing as first processing. For example, the first processing may include the following processing.

The managing unit 2a receives, when the type of a storage apparatus 4 identified by the apparatus monitoring unit 24 is a first storage apparatus 4a, first performance information regarding a performance of the first storage apparatus 4a sent from the first storage apparatus 4a.

The managing unit 2a stores the received first performance information in a database as data of a table coordinating the received first performance information for each time period of reception.

In addition, the managing unit 2*b* (e.g., the apparatus monitoring unit 27) is one example of a second processing unit configured to execute performance information obtainment processing as second processing. For example, the second processing may include the following processing.

The managing unit 2*b* receives, when the type of a storage apparatus 4 identified by the apparatus monitoring unit 24 is a second storage apparatus 4*b*, second performance information regarding a performance of the second storage apparatus 4*b* sent from the second storage apparatus 4*b*.

The managing unit 2*b* stores the received second performance information in a storing unit as data of a text-format file.

(1-2-2) Performance Information Deletion Processing

Next, referring to FIG. 14, an example of operations of performance information deletion processing in the server 2 in the storage system 1 will be described.

Note that the performance information deletion processing may be carried out at deletion determination timing, such as regularly in certain cycles (e.g., cycles of several dozens of seconds), for identifying PTs to be deleted, which outlive over a preservation duration. Note that the deletion determination timing may be a time duration corresponding to the preservation duration or the time-wise storage unit term of PTs.

Figure 14:
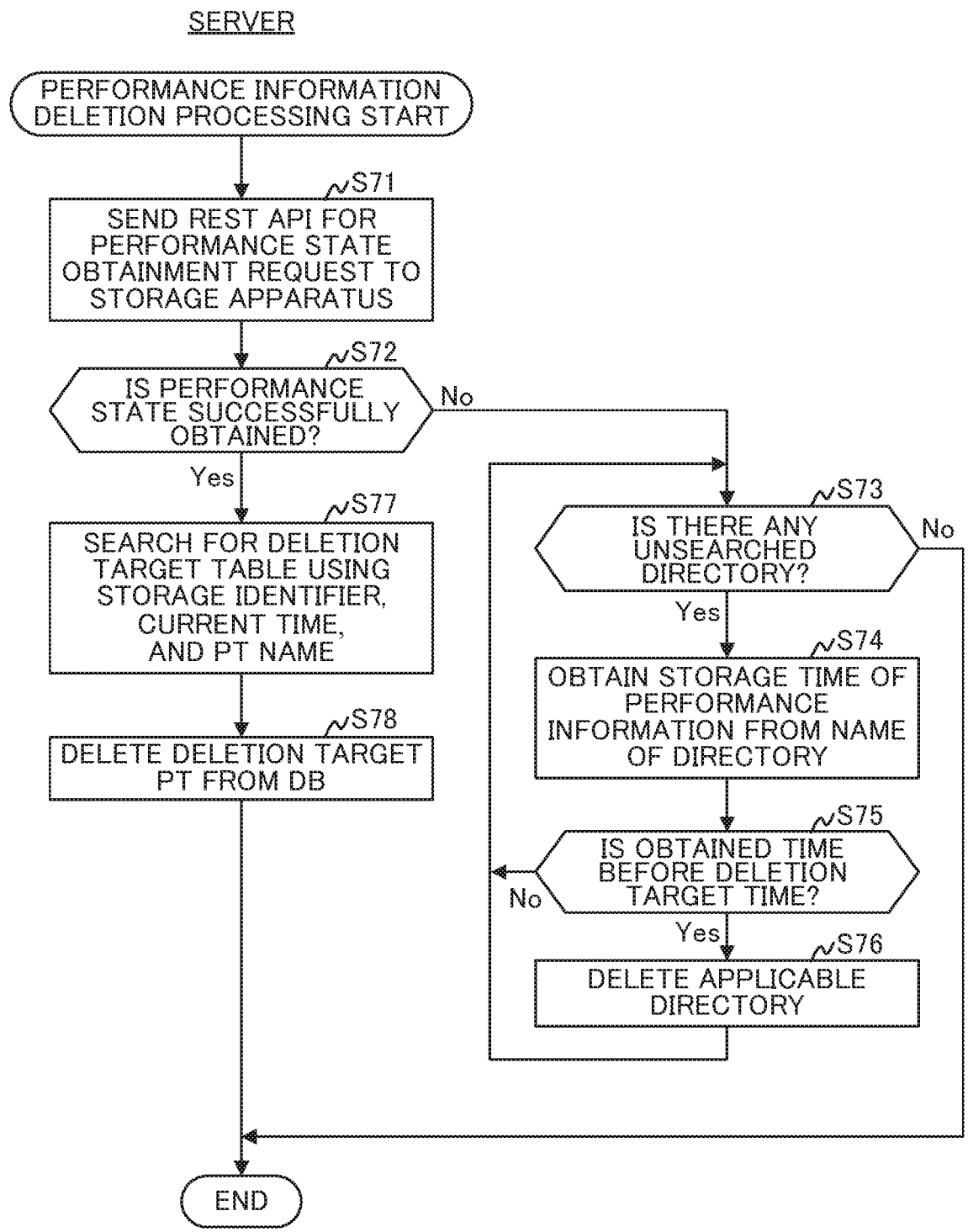
FIG. 14 is a flowchart illustrating an example of operations of performance information deletion processing in accordance with one embodiment.

As exemplified in FIG. 14, the apparatus monitoring unit 24 issues a REST API for a performance state obtainment request to the storage apparatuses 4 (e.g., every storage apparatus 4 connected to the server 2), by referring to the configuration information 211. The IF controlling unit 23 sends the request to the storage apparatuses 4 via the networks 1*a* and 1*b* through the framework of the REST API (Step S71).

The apparatus monitoring unit 24 determines whether or not information on the performance state is successfully obtained from a controller 3 via the IF controlling unit 23 (Step S72). A failure in successfully receiving information (No from Step S72) indicates that the controller 3, to which the performance state obtainment request was sent, is a controller 3*b* in a storage apparatus 4*b* not supporting the REST API.

Therefore, in this case, the apparatus monitoring unit 24 instructs the managing unit 2*b* to execute performance information obtainment processing for the controller B, on the storage apparatus 4*b*, from which information on the performance state could not be obtained successfully.

The apparatus monitoring unit 27 in the managing unit 2*b* determines whether or not there is any unsearched directory in the file system managing the CSV 222 in the memory unit 22 (Step S73).

If there is any unsearched directory (Yes from Step S73), the apparatus monitoring unit 27 identifies the storage time as to when performance information was stored, from the name of the directory (Step S74). The apparatus monitoring unit 27 then determines whether or not the identified time matches the deletion target time (e.g., whether or not the identified time is before (earlier than) the time determined by subtracting the preservation duration from the current time) (Step S75).

If the identified time does not match the deletion target time (No from Step S75), the processing transitions to Step S73. Otherwise, if the identified time matches the deletion target time (Yes from Step S75), the apparatus monitoring unit 27 deletes an applicable directory (Step S76) and the processing transitions to Step S73.

If there is no unsearched directory in Step S73 (No from Step S73), the performance information deletion processing ends.

Figure 15:
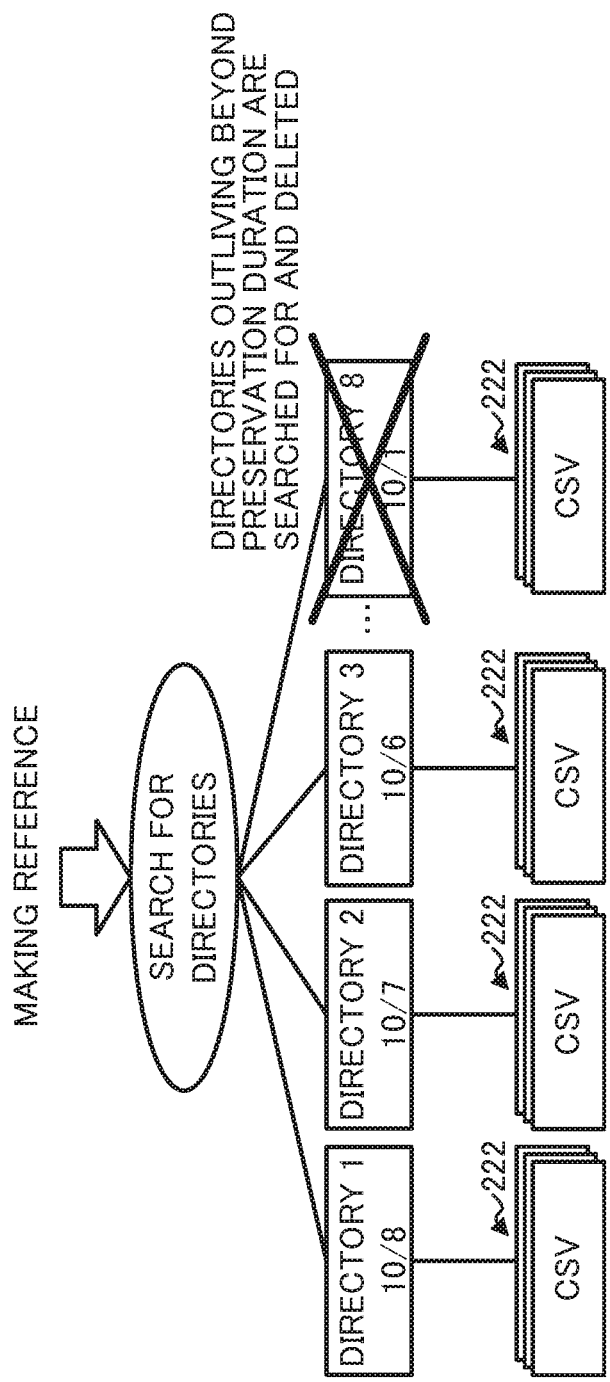
FIG. 15 is a diagram illustrating an example of operations of a search and a deletion of a directory using a file system.

Hereinafter, referring to FIG. 15, an example of the performance information deletion processing for the controller B will be described. As exemplified in FIG. 15, it is assumed that Directories 1-8, which are directories for October the $1^{st}$ to the $8^{th}$, respectively, are managed in the file system, the storage unit term is set to one (1) day, and the preservation duration is set to seven (7) days.

For example, the apparatus monitoring unit 27 identifies that the directory for October the $1^{st}$ outlives beyond the preservation lifetime, among performance information managed as Directories 1-8 in the file system. The apparatus monitoring unit 27 then deletes Directory 8 for October the 1st, thereby deleting a deletion target CSV 222.

Referring back to the descriptions of FIG. 14, a successful obtainment of a performance state from a controller 3*a* in Step S72 (Yes from Step S72) indicates that the controller 3, to which the performance state obtainment request was sent, is a controller 3*a* in a storage apparatus 4*a* supporting the REST API.

In this case, the apparatus monitoring unit 24 executes performance information deletion processing for the controller A on the storage apparatus 4*a*.

The apparatus monitoring unit 24 searches for a table to be deleted, using the storage identifier, the current time, and the PT name (Step S77).

For example, using a logical table, the apparatus monitoring unit 24 searches for a PT with a PT name including time that matches the deletion target time (e.g., the time contained in the PT name is previous to the time determined by subtracting the preservation duration from the current time), from multiple PTs (PT names) including the storage identifier of the deletion determination target.

The apparatus monitoring unit 24 then deletes the deletion target PT that was identified in the search, from the performance information 212 in the DB 21 (Step S78), and the performance information deletion processing ends. In response to the deletion of the PT, the apparatus monitoring unit 24 may delete an entry of the PT name corresponding to the deletion target PT, from the administration table 213.

As set forth above, based on the table name of a table stored in the DB 21 and the current time, the apparatus monitoring unit 24 deletes the table outliving over the preservation duration from the DB 21, in certain cycles.

Figure 16:
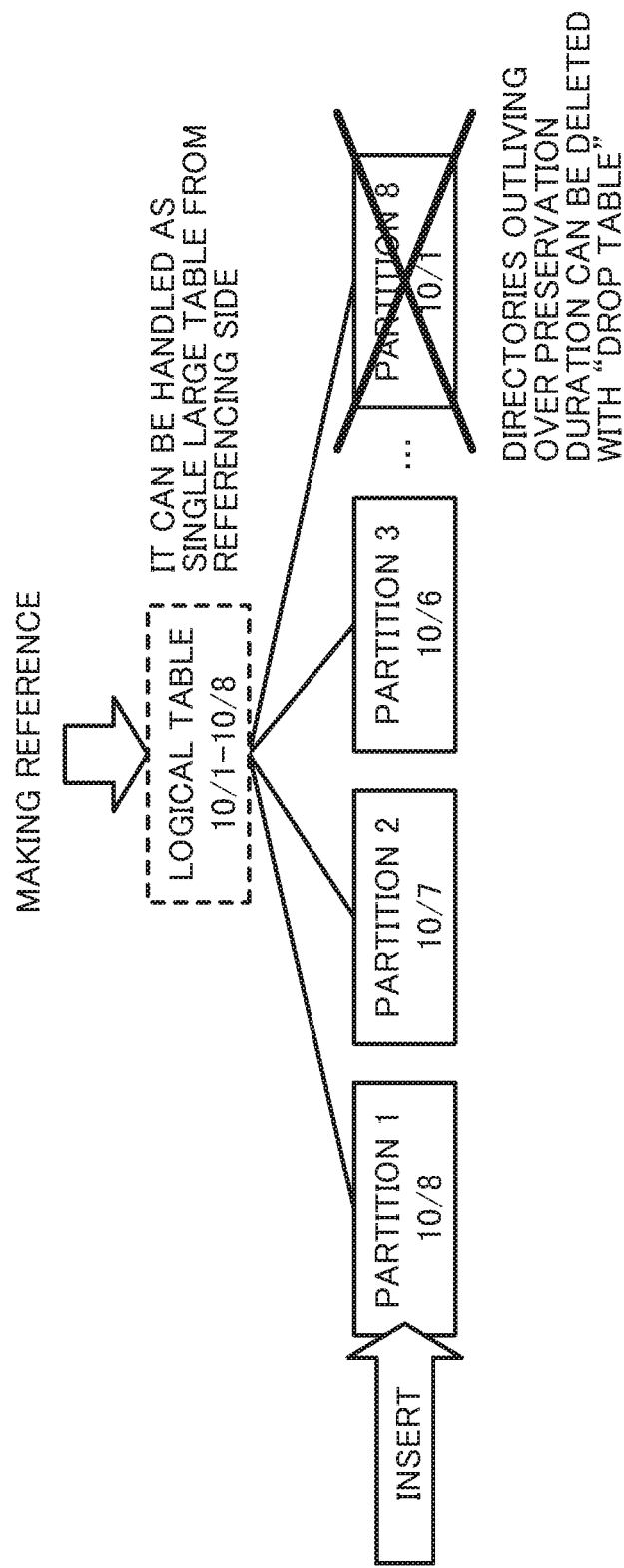
FIG. 16 is a diagram illustrating an example of operations of a search and a deletion of a partition table using a logical table.

Hereinafter, referring to FIG. 16, an example of the performance information deletion processing for the controller A will be described. As exemplified in FIG. 16, it is assumed that PTs for October the $1^{st}$ to the $8^{th}$ are managed in a logical table of PTs, the storage unit term of PTs is set to one (1) day, and the preservation duration is set to seven (7) days.

In this case, referring to the logical table, the apparatus monitoring unit 24 identifies a PT that outlives over the preservation duration, e.g., the PT for October the $1^{st}$.

As set forth above, because PTs are created and managed on the basis of the storage unit term, the apparatus monitoring unit 24 deletes the PT outliving over the preservation duration, using a command, such as "Drop Table", for example.

Note that the logical table may be provided by the apparatus monitoring unit 24, as a function by which particular PTs can be searched for (extracted) at once from the performance information 212, for example. More specifically, the logical table may be embodied as a window in which the apparatus monitoring unit 24 extracts particular PTs from the performance information 212, not as tables actually managed as data (e.g., in the DB 21).

In the logical table, PTs having PT names containing a string corresponding to a particular portion of a PT name can be searched for, for example. As used therein, the term "particular portion" may mean the portion "performance_xxxxxx", which is identifiable for each storage, in a PT name (in other words, the portion excluding the resource type and the storage unit term from the PT name, e.g., the portion excluding "storages_part_20171001").

In this manner, the apparatus monitoring unit 24 can handle, as a single large table, information on PTs containing a string corresponding to a certain portion (e.g., PTs regarding a certain storage "xxxxxx<x"), from multiple PTs included in the performance information 212. A logical table having such a function may be used when the server 2 provides users with performance information.

Although the logical table is described as the function for searching for PTs from the performance information 212, this is not limiting and a function may be provided for searching for a list of particular PT names from the administration table 213. In this case, in addition to or in place of a PT name, the storage identifier, the resource type, the start time, the end time, and the last update time in the administration table 213 may be used as search keys.

As set forth above, because the managing unit 2a manages performance data not in CSV format but in the DB 21, the efficiency of searches of deletion targets by the apparatus monitoring unit 24 can be improved, in comparison to searches of deletion targets on the file system. In addition, in the DB 21, the performance information 212 is divided into PTs for respective obtainment date and time, and the apparatus monitoring unit 24 deletes information in performance information 212 for each PT outliving beyond the preservation lifetime. As a result, the processing load on the server 2 can be mitigated, and the overhead of the deletion processing can be improved.

In addition, in the DB 21, when records are imported, records in the deletion unit term are bundled into a PT. Then at the timing of monitoring the PTs outliving beyond the preservation lifetime, the apparatus monitoring unit 24 deletes all deletion target PTs at once. This can improve the efficiency of the deletion processing, as compared to cases where records in a single table are filtered by the deletion time period, and found records are deleted.

Note that the preservation duration for PTs including performance data for developers (byte sequences in a compressed file) may be set so as to be different from the preservation duration for PTs including performance data for at least users. As one example, when the preservation duration for PTs including performance data for at least users is set to 90 days, the preservation duration for PTs including performance data for developers may be about seven days, which is shorter than 90 days, for example.

The apparatus monitoring unit 24 may carry out search and deletion processings of deletion target tables in Steps S77 and S78, respectively, based on the difference between the preservation durations as described above, for example.

(1-3) Examples of Hardware Configurations

Next, referring to FIG. 17, example of the hardware configurations of the server 2, and the controllers 3a and 3b in accordance with one embodiment, will be described. Because the server 2, and the controllers 3a and 3b may have similar hardware configurations, the hardware configuration of a computer 10 will be described, using the computer 10 as examples of the server 2, and the controllers 3a and 3b.

As depicted in FIG. 17, the computer 10 may include a processor 10a, a memory 10b, a storing unit 10c, an IF unit 10d, an I/O unit 10e, and a reader unit 10f, for example.

The processor 10a is one example of a processing unit configured to perform a wide variety of controls and computations. The processor 10a may be communicatively connected to each other to each block in the computer 10 via a bus 10i. As the processor 10a, integrated circuits (ICs), such as CPUs, MPUs, GPUs, APUs, DSPs, ASICs, and FPGAs may be used, for example. Note that MPU is an abbreviation for Micro Processing Unit, and GPU is an abbreviation for Graphics Processing Unit. APU is an abbreviation for Accelerated Processing Unit, and DSP is an abbreviation for Digital Signal Processor. ASIC is an abbreviation for Application Specific IC, and FPGA is an abbreviation for Field-Programmable Gate Array.

The memory 10b is one example of hardware configured to store information, such as a wide variety of data and programs. Examples of the memory 10b include volatile memories, such as RAMs, for example.

The storing unit 10c is one example of hardware configured to store information, such as a wide variety of data and programs. Examples of the storing unit 10c include magnetic disk apparatuses, e.g., HDDs, solid state drive apparatuses, e.g., SSDs, and a wide variety of storing apparatuses, e.g., non-volatile memories, for example. Non-volatile memories include flash memories, storage class memories (SCMs), and read only memories (ROMs), for example.

Note that, in the server 2, the DB 21 and the memory unit 22 depicted in FIG. 2 may be embodied by storing areas in at least one of the memory 10b and the storing unit 10c in the server 2, for example. In addition, in a controller 3a, the DB 31 depicted in FIG. 5 may be embodied by storing areas in at least one of the memory 10b and the storing unit 10c in the controller 3a, for example. Furthermore, in a controller 3b, the memory unit 33 depicted in FIG. 6 may be embodied by storing areas in at least one of the memory 10b and the storing unit 10c in the controller 3b, for example.

In addition, the storing unit 10c may store a program 10g for embodying all or a part of the functions by the computer 10. The processor 10a can embody the functions as the server 2, or the controller 3a or 3b, by expanding the program 10g stored in the storing unit 10c into the memory 10b and executing the program 10g expanded on the memory 10b.

For example, in the server 2, the processor 10a in the server 2 can embody the functions as the managing units 2a and 2b by expanding the program 10g stored in the storing unit 10c into the memory 10b and executing computations processing. In addition, in a controller 3a, the processor 10a in the controller 3a can embody the functions as the controlling unit 32 by expanding the program 10g stored in the storing unit 10c into the memory 10b and executing computations processing. Furthermore, in a controller 3b, the processor 10a in the controller 3a can embody the functions as the controlling unit 34 by expanding the program 10g stored in the storing unit 10c into the memory 10b and executing computations processing.

The IF unit 10d is one example of a communication interface configured to carry out processing, such as controls on connections to and communications with networks. For example, the IF unit 10d may include an adaptor compliant with LAN or optical communication standards, e.g., the Fibre Channel (FC).

For example, the IF unit 10*d* in the server 2 may include a communication interface that controls connections to and communications with the networks 1*a* and 1*b*. The IF controlling units 23 and 26 in the server 2 are examples of such a communication interface. In addition, the IF unit 10*d* in a controller 3*a* may include a communication interface that controls connections to and communications with the network 1*a*. Furthermore, the IF unit 10*d* in a controller 3*b* may include a communication interface that controls connections to and communications with the network 1*b*.

For example, the program 10*g* for the server 2, or the controller 3*a* or 3*b* may be downloaded from one of the networks 1*a* and 1*b* via the communication interfaces described above, and may be stored in the storing unit 10*c*.

The I/O unit 10*e* may include either or both of: an input unit, such as a mouse, a keyboard, and operation buttons; and an output unit, such as a monitor e.g., a touch panel display and a liquid crystal display (LCD), a projector, and a printer.

The reader unit 10*f* is one example of a reader configured to read information on data and programs recorded on a recording medium 10*h*. The reader unit 10*f* may include a connection terminal or device, to which the recording medium 10*h* can be connected or inserted. Examples of the reader unit 10*f* include adaptors compliant with the Universal Serial Bus (USB) standard, drive apparatuses for accessing recording disks, and card readers for accessing flash memories, e.g., SD cards. Note that the program 10*g* may be stored in the recording medium 10*h*, and the reader unit 10*f* may read the program 10*g* from the recording medium 10*h* and may store the program 10*g* in the storing unit 10*c*.

Examples of the recording medium 10*h* may include non-transitory recording media, such as magnetic/optical disks and flash memories, for example. Examples of magnetic/optical disks may include flexible disks, compact discs (CDs), digital versatile discs (DVDs), Blu-ray Discs, and holographic versatile discs (HVDs), for example. Examples of flash memories may include USB memories and SD cards, for example. Note that examples of CDs may include CD-ROMs, CD-Rs, and CD-RWs, for example. Further, examples of DVDs may include DVD-ROMs, DVD-RAMs, DVD-Rs, DVD-RWs, DVD+Rs, and DVD+RWs, for example.

The hardware configuration of the computer 10 described above is merely exemplary. Accordingly, in each of the server 2, and the controllers 3*a* and 3*b*, hardware may be added or omitted in the computer 10 (e.g., any blocks may be added or omitted), divided, or combined in any combinations, or a bus may be added or omitted, where it is deemed appropriate.

(2) Miscellaneous

The above-describe technique in accordance with one embodiment may be practiced in the following modifications or variations.

For example, in the server 2, the functions of the managing units 2*a* and 2*b* may be combined in any combinations, or may be separate. In addition, in the managing unit 2*a* in the server 2, the functions of the IF controlling unit 23, the apparatus monitoring unit 24, and the DB managing unit 25 may be combined in any combinations, or may be separate. Furthermore, in the managing unit 2*b* in the server 2, the functions of the IF controlling unit 26 and the apparatus monitoring unit 27 may be combined in any combinations, or may be separate.

In addition, the processing to distinguish between the storage apparatuses 4*a* and 4*b* in Steps S51 and S52 in FIG. 12 and Steps S71 and S72 in FIG. 14 may be omitted if a result of the distinguishment in the distinguishment processing in Steps S1 and S2 in FIG. 8 is available, for example.

For example, the apparatus monitoring unit 24 may manage the result of the distinguishment in Steps S1 and S2 by relating it to the identification information, address information, and the like on a storage apparatus 4. In this case, the DB managing unit 25 and the apparatus monitoring unit 24 may carry out processing to refer to the information managing the result of the distinguishment, in place of carrying out the processing in Steps S51 and S52 and Steps S71 and S72.

In one aspect, obtainment processing of performance information from storage apparatuses by a storage management apparatus can be implemented in an efficient manner.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage management apparatus comprising:
a memory; and
a processor coupled to the memory,
wherein the processor is configured to:
  receive state information regarding a state of a storage apparatus sent from the storage apparatus, and identify a type of the storage apparatus based on a result of reception of the state information;
  execute first processing to receive, when the identified type of the storage apparatus is a first storage apparatus, first performance information regarding a performance of the first storage apparatus sent from the first storage apparatus, and store the received first performance information in a database as data of a table coordinating the received first performance information for each time period of reception;
  execute second processing to receive, when the identified type of the storage apparatus is a second storage apparatus, second performance information regarding a performance of the second storage apparatus sent from the second storage apparatus, and store the received second performance information in the memory as data of a text-format file; and
  switch between an execution of the first processing and an execution of the second processing depending on the identified type of the storage apparatus.

2. The storage management apparatus according to claim 1, wherein
the first performance information comprises a plurality of performance data items of respective performance classifications, and
in the first processing, the processor is further configured to store the plurality of performance data items received from the first storage apparatus in the database as the data of the table, the table coordinating the plurality of performance data items for the respective time periods and for the respective performance classifications.

3. The storage management apparatus according to claim 2, wherein in the first processing, the processor is further configured to:
  receive the first performance information from the first storage apparatus, the first performance information being compressed data in which the plurality of performance data items of the respective performance classifications are compressed by the first storage apparatus;
  obtain at least one of the performance data items by decompressing at least a part of the received compressed data; and
  store the obtained at least one performance data item in the database as the data of the table, the table coordinating the at least one performance data item for the respective time periods and for the respective performance classifications.

4. The storage management apparatus according to claim 3, wherein, in the first processing, the processor is further configured to store, in the database, one or more performance data items in a portion that is not decompressed of the received compressed data, in a compressed format.

5. The storage management apparatus according to claim 2, wherein
  file names of the plurality of performance data items included in the first performance information include respective performance classifications of the performance data items and obtainment time of when the performance data items have been obtained, and
  in the first processing, the processor is further configured to search for the table to store the performance data item based on the file name of that performance data item.

6. The storage management apparatus according to claim 2, wherein
  a table name of a table stored in the database includes a performance classification of performance data items included in the table, and a time period during which the performance data items included in the table have been received, and
  the processor is further configured to delete the table outliving over a preservation duration, from the database in given cycles, based on the table name of that table stored in the database and current time.

7. A storage system comprising:
  a storage apparatus; and
  a storage management apparatus configured to manage the storage system;
  wherein the storage management apparatus comprises:
    a memory; and
    a processor coupled to the memory,
    the processor is configured to:
      receive state information regarding a state of the storage apparatus sent from the storage apparatus, and identify a type of the storage apparatus based on a result of reception of the state information; and
      switch between an execution of first processing and an execution of second processing depending on the identified type of the storage apparatus,
    in the first processing, the processor is further configured to:
      receive, when the identified type of the storage apparatus is a first storage apparatus, first performance information regarding a performance of the first storage apparatus sent from the first storage apparatus; and
      store the received first performance information in a database as data of a table coordinating the received first performance information for each time period of reception, and
    in the second processing, the processor is further configured to:
      receive, when the identified type of the storage apparatus is a second storage apparatus, second performance information regarding a performance of the second storage apparatus sent from the second storage apparatus; and
      store the received second performance information in the memory as data of a text-format file.

8. The storage system according to claim 7, wherein
  the first performance information comprises a plurality of performance data items of respective performance classifications, and
  in the first processing, the processor is further configured to store the plurality of performance data items received from the first storage apparatus in the database as the data of the table, the table coordinating the plurality of performance data items for the respective time periods and for the respective performance classifications.

9. The storage system according to claim 8, wherein
  the first storage apparatus is configured to send, to the storage management apparatus as the first performance information, the first performance information being compressed data in which the plurality of performance data items of the respective performance classifications are compressed, and
  in the first processing, the processor is further configured to:
    receive the compressed data from the first storage apparatus;
    obtain at least one of the performance data items by decompressing at least a part of the received compressed data; and
    store the obtained at least one performance data item in the database as the data of the table, the table coordinating the at least one performance data item for the respective time periods and for the respective performance classifications.

10. The storage system according to claim 9, wherein, in the first processing, the processor is further configured to store, in the database, one or more performance data items in a portion that is not decompressed of the received compressed data, in a compressed format.

11. The storage system according to claim 8, wherein
  the first storage apparatus is further configured to set, to file names of the plurality of performance data items included in the first performance information, respective performance classifications of the performance data items and obtainment time of when the performance data items have been obtained, and send the first performance information to the storage management apparatus, and
  in the first processing, the processor is further configured to search for the table to store the performance data item based on the file name of that performance data item included in the received first performance information.

12. The storage system according to claim 8, wherein
  a table name of a table stored in the database includes a performance classification of performance data items included in the table, and a time period during which the performance data items included in the table have been received, and the processor is further configured to delete the table outliving over a preservation duration, from the database in given cycles, based on the table name of that table stored in the database and current time.

13. A non-transitory computer-readable recording medium having stored therein a storage management program for causing a computer to execute a process comprising:

receiving state information regarding a state of a storage apparatus that is sent from the storage apparatus, and identifying a type of the storage apparatus based on a result of reception of the state information; and switching between an execution of first processing and an execution of second processing depending on the identified type of the storage apparatus, wherein, in the first processing, the process comprises:

receiving, when the identified type of the storage apparatus is a first storage apparatus, first performance information regarding a performance of the first storage apparatus sent from the first storage apparatus; and storing the received first performance information in a database as data of a table coordinating the received first performance information for each time period of reception, and in the second processing, the process comprises:

receiving, when the identified type of the storage apparatus is a second storage apparatus, second performance information regarding a performance of the second storage apparatus sent from the second storage apparatus; and storing the received second performance information in a memory as data of a text-format file.

14. The non-transitory computer-readable recording medium according to claim 13, wherein the first performance information comprises a plurality of performance data items of respective performance classifications, and in the first processing, the process comprises storing the plurality of performance data items received from the first storage apparatus in the database as the data of the table, the table coordinating the plurality of performance data items for the respective time periods and for the respective performance classifications.

15. The non-transitory computer-readable recording medium according to claim 14, wherein, in the first processing, the process comprises:

receiving the first performance information from the first storage apparatus, the first performance information being compressed data in which the plurality of performance data items of the respective performance classifications are compressed by the first storage apparatus;

obtaining at least one of the performance data items by decompressing at least a part of the received compressed data; and storing the obtained at least one performance data item in the database as the data of the table, the table coordinating the at least one performance data item for the respective time periods and for the respective performance classifications.

16. The non-transitory computer-readable recording medium according to claim 15, wherein, in the first processing, the process comprises storing, in the database, one or more performance data items in a portion that is not decompressed of the received compressed data, in a compressed format.

17. The non-transitory computer-readable recording medium according to claim 14, wherein file names of the plurality of performance data items included in the first performance information include respective performance classifications of the performance data items and obtainment time of when the performance data items have been obtained, and in the first processing, the process comprises searching for the table to store the performance data item based on the file name of that performance data item.

18. The non-transitory computer-readable recording medium according to claim 14, wherein a table name of a table stored in the database includes a performance classification of performance data items included in the table, and a time period during which the performance data items included in the table have been received, and the process comprises deleting the table outliving over a preservation duration, from the database in given cycles, based on the table name of that table stored in the database and current time.

* * * * *